(12) United States Patent
Muto

(10) Patent No.: US 6,510,290 B2
(45) Date of Patent: *Jan. 21, 2003

(54) IMAGE PROCESSING METHOD WITH CONTROL OF DISCHARGE OF PAGES IN IMAGE FORMING APPARATUS

(75) Inventor: Tsuyoshi Muto, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,444

(22) Filed: Nov. 24, 1998

(65) Prior Publication Data

US 2002/0018665 A1 Feb. 14, 2002

(30) Foreign Application Priority Data

Nov. 27, 1997 (JP) .............................. 9-326207

(51) Int. Cl.⁷ .............................................. G03G 15/00
(52) U.S. Cl. .......................... 399/18; 358/1.16; 399/405
(58) Field of Search .............................. 399/16, 18, 19, 399/23, 403, 404, 405; 358/296; 395/101, 111, 112, 117; 271/65

(56) References Cited

U.S. PATENT DOCUMENTS 6,104,498 A * 8/2000 Shima et al. .......... 358/1.16 X

FOREIGN PATENT DOCUMENTS

| JP | 8-328430 | 12/1996 |
| JP | 9-295748 | * 11/1997 |
| JP | 10-166672 | * 6/1998 |

* cited by examiner

Primary Examiner—Joan Pendegrass
(74) Attorney, Agent, or Firm—Fitzpatrick, Cella, Harper & Scinto

(57) ABSTRACT

In the course of a printing job, if the capacity of a designated face-up (or face-down) discharge exit is exceeded, the printing is executed in the inverted order of pages and the printed sheets are discharged to a face-down (or face-up) discharge exit.

15 Claims, 22 Drawing Sheets

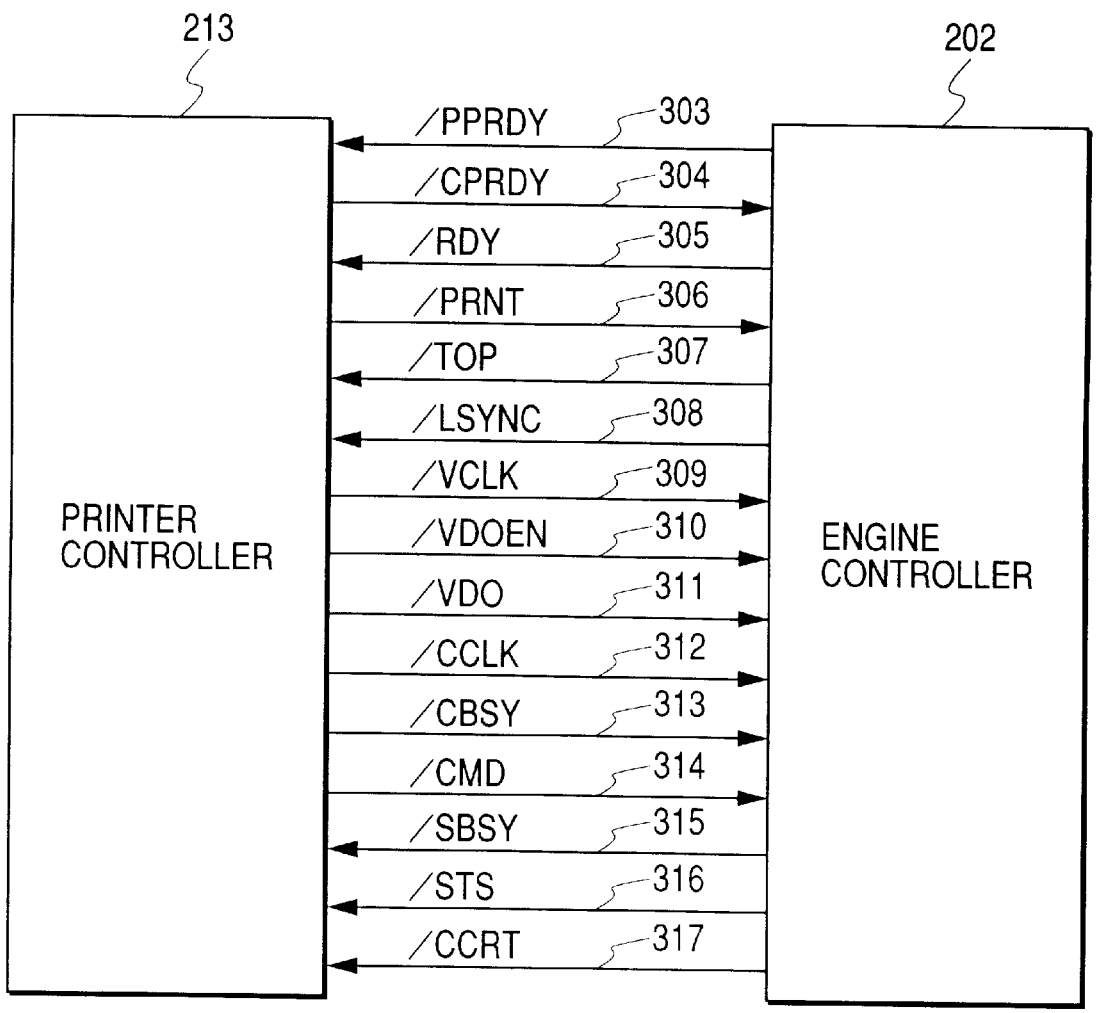

FIG. 4

VIDEO I/F SIGNALS

| SIGNAL NAME | ABBREVIATION | SIGNAL DIRECTION |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINT | /PRNT | CONTROLLER → PRINTER |
| TOP OF PAGE | /TOP | CONTROLLER ← PRINTER |
| LINE SYNCHRONIZATION | /LSYNC | CONTROLLER ← PRINTER |
| VIDEO CLOCK | /VCLK | CONTROLLER → PRINTER |
| VIDEO ENABLE | /VDOEN | CONTROLLER → PRINTER |
| VIDEO | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER → PRINTER |
| STATUS BUSY | /SBSY | CONTROLLER ← PRINTER |
| STATUS | /STS | CONTROLLER ← PRINTER |
| PRINTER FEED READY | /PFED | CONTROLLER ← PRINTER |
| SPEED CHANGE | /SPCHG | CONTROLLER ← PRINTER |
| PAPER DELIVERY | /PDLV | CONTROLLER ← PRINTER |
| TOP OF PAPER | /TOPR | CONTROLLER ← PRINTER |
| STATUS CHANGE REPORT | /CCRT | CONTROLLER ← PRINTER |

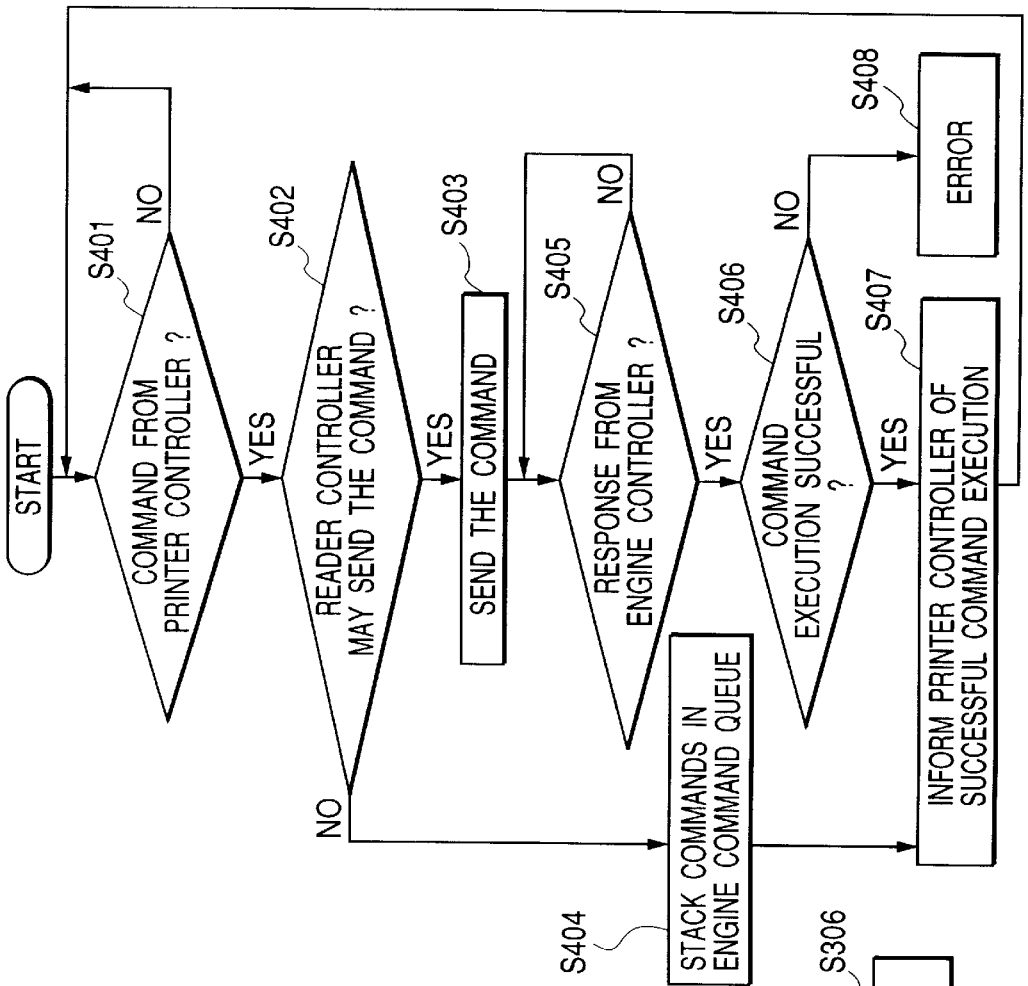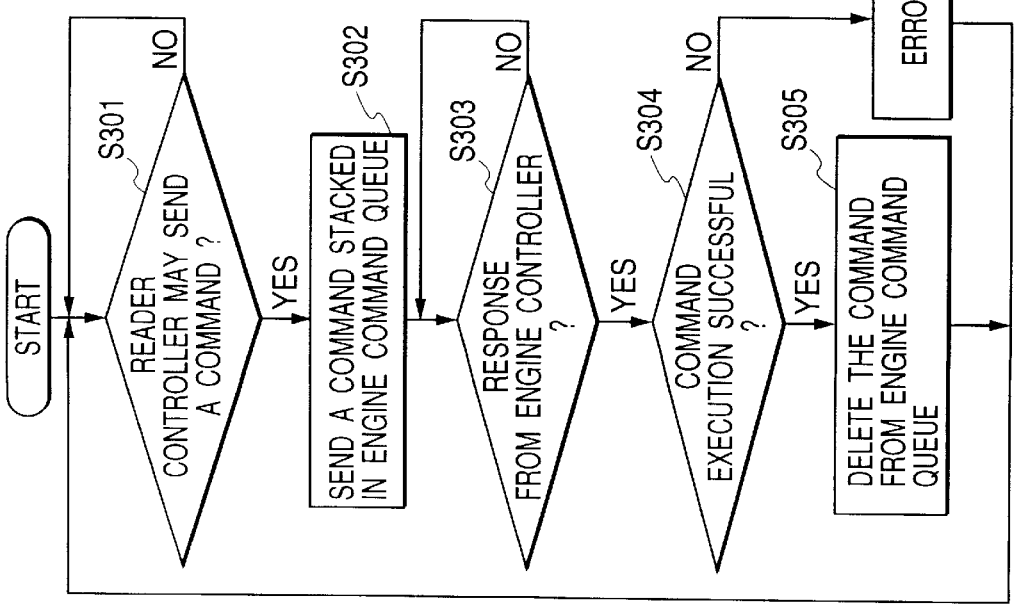

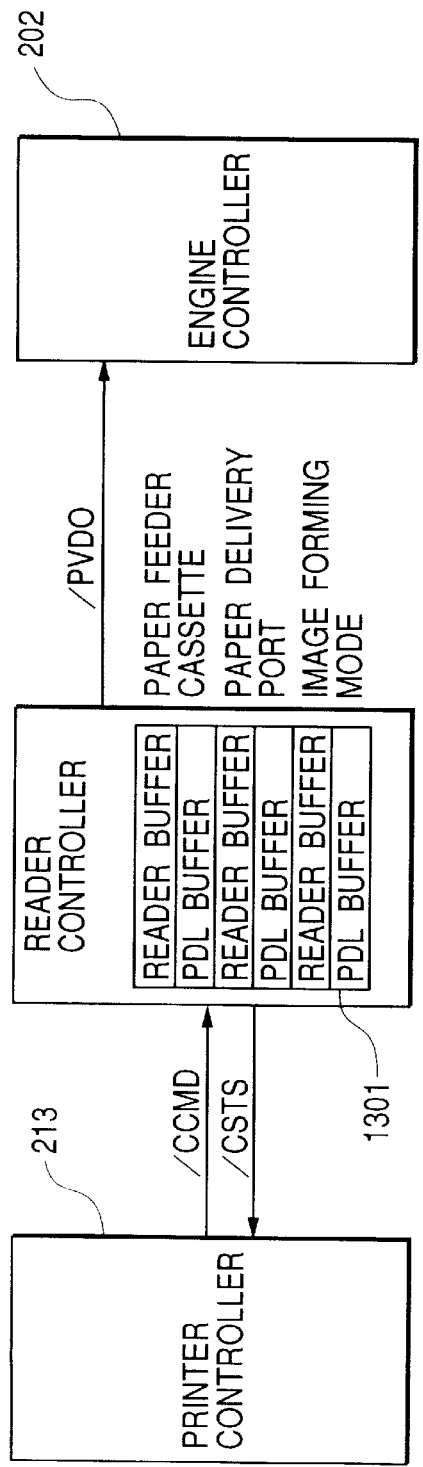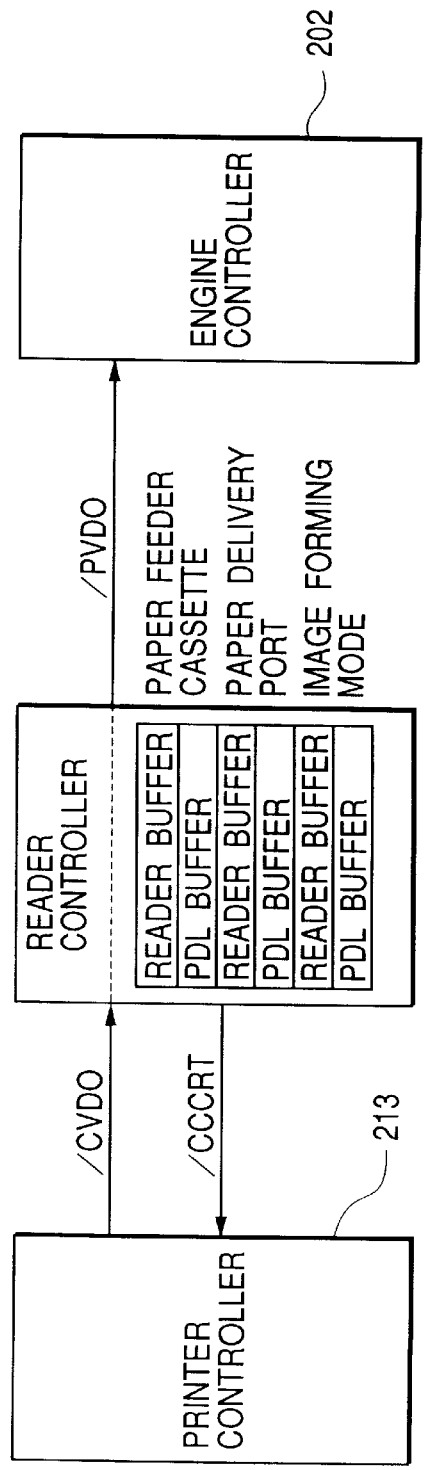

IMAGE PROCESSING METHOD WITH CONTROL OF DISCHARGE OF PAGES IN IMAGE FORMING APPARATUS

BACKGROUND OF THE INVENTION

1. Field of the Invention

The present invention relates to an image processing method adapted for use in an image processing apparatus such as a printer or a copying apparatus, and an image forming apparatus utilizing the same.

2. Related Background Art

In case of printing a document prepared by a computer or the like, the application which instructs printing outputs the data to a printer unit through a printer driver registered in the computer (operating system (OS)). The printer driver translates the information transferred from the upper process (application or OS in this case) into a page description language (PDL) for transfer to the printer unit. Also in case the discharge destination (for example of a tray of the printer unit) is designated for the recording medium (such as recording sheet), the information on such discharge destination is transferred as PDL data to the printer unit.

The printer unit analyzes the transferred PDL data, executes bit map development for each page and outputs thus prepared bit map to a printer engine for printing an image on the recording medium. In case the discharge destination is designated, the printer unit discharges the recording medium to the designated discharge destination. In case the discharge to the designated discharge destination is not possible, there can be conceived methods of suspending the discharge is either suspended until the discharge to the designated discharge destination becomes possible and effecting discharge to another available destination.

However, the former method results in a drawback that the printing job itself has to be stopped in case of suspending the discharge. Also in the latter method, in case, for example, the initially designated discharge destination is a face-down tray on which the recording sheets are discharged with the printed faces thereof downwards while the changed destination is a face-up tray on which the recording sheets are discharged with the printed faces thereof upwards, the order of the discharged recording media is inverted in comparison with the intended order.

SUMMARY OF THE INVENTION

In consideration of the foregoing, the object of the present invention is to provide an image processing apparatus capable of providing the result of discharge in the intended order even in case the discharge destination is changed.

The image processing apparatus of the present invention is constructed in the following manner, and comprises printing means for executing printing based on the image data, plural support means for supporting printed recording media, detection means for detecting that the designated support means, among the plural support means, becomes incapable of supporting the recording media, and control means, in case the designated support means becomes incapable of supporting the recording media, for outputting the recording media in an inverted order of pages to another support means among the plural support means.

Advantageously, the image processing apparatus further comprises input means for inputting image information, conversion means for converting the input image information into printable image data, and memory means for storing the converted image data.

BRIEF DESCRIPTION OF THE DRAWINGS

FIG. 3 is a block diagram showing the connection configuration between a printer controller and an engine controller;

FIG. 4 is a list of signals of a video I/F;

FIGS. 17A and 17B are flowcharts showing the communication sequence in case the reader is mounted;

FIG. 19 is a block diagram showing a print request in the course of a copying operation;

FIG. 20 is a block diagram showing a copy request in the course of a copying operation;

DETAILED DESCRIPTION OF THE PREFERRED EMBODIMENTS

First Embodiment

At first there will be explained the entire configuration of the image processing apparatus of the present invention.

Figure 1:
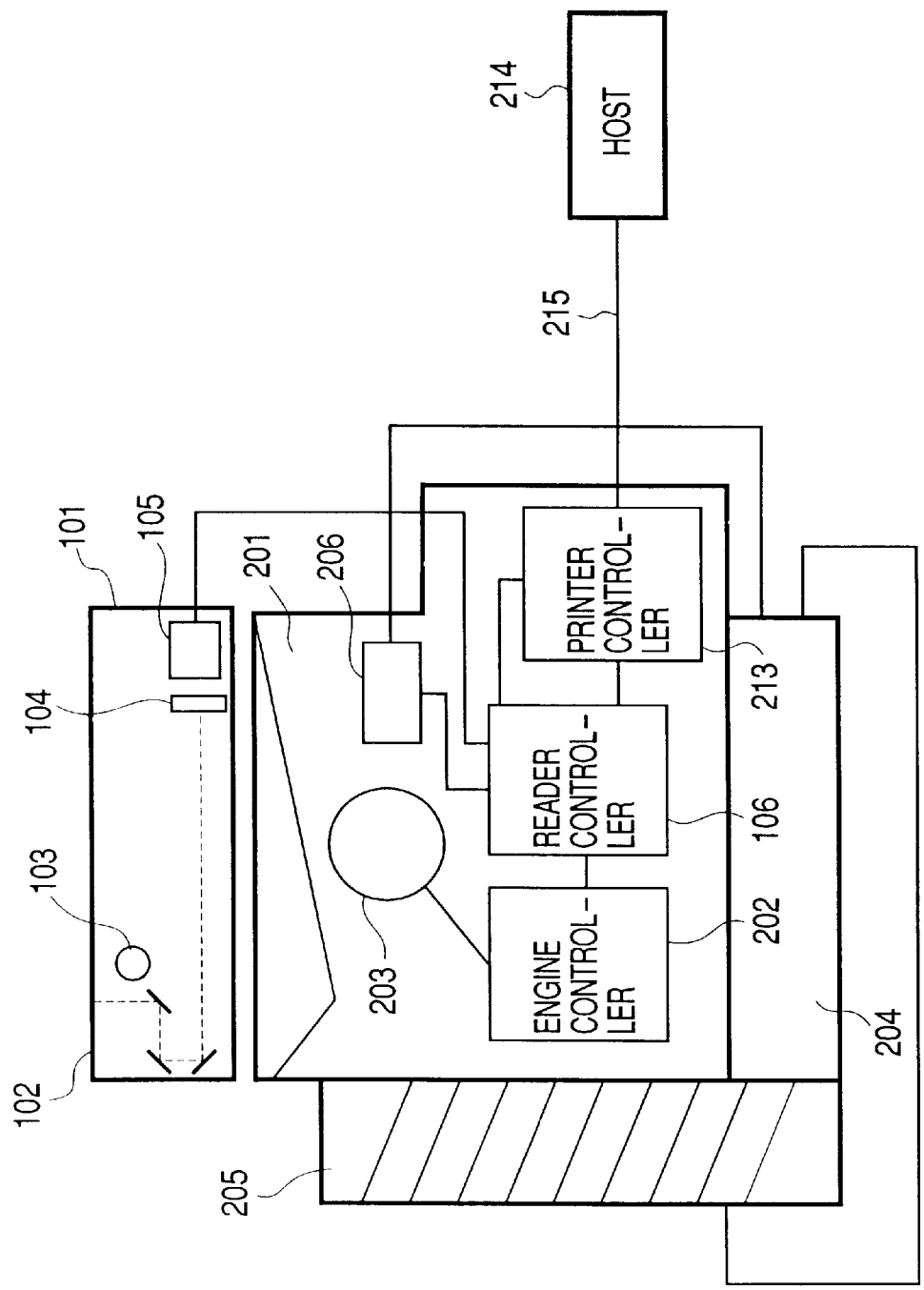
FIG. 1 is a cross-sectional view showing the principal parts of an image processing apparatus of the present invention.

FIG. 1 is a cross-sectional view showing the principal configuration of a printing apparatus embodying the present invention.

Referring to FIG. 1, there are shown a reader frame 101, an original table 102, a light source 103 for illuminating an original, photoelectric conversion means 104 for effecting photoelectric conversion of the optical information from the original, an analog/digital converter 105 for converting the photoelectrically converted analog image signal into a digital signal, and a reader controller 106 for controlling the reading operation by the reader.

There are also shown a printer main body 201, an engine controller (DC controller) 202 for controlling the sheet transportation in the printer and controlling the image forming operation for example in an image forming unit and a printer 203, a printer (PDL) controller 213 incorporated in the printer main body 201, a host computer 214 connected one-to-one or through a network 215 to the printer controller 213, an optionally addable sheet cassette deck 204, an optionally addable sorter 205, and an optional controller 206 for controlling the sheet cassette deck 204 and the sorter 205.

The reader controller 106 is provided with unrepresented process means for the digital image outputted from the analog/digital converter, unrepresented motor control means for reading the original, and a function of controlling communication with the DC controller 202 and the printer controller 213. In the present embodiment, the reader controller 106 is positioned in the main body 201, so that no outside cables are provided for communication control with the DC controller 202 or the printer controller 213.

The reader controller 106 is connected between the printer controller and the printer unit. In the following there will be explained the configuration of the printer controller 213 and the printer unit.

Figure 2A:
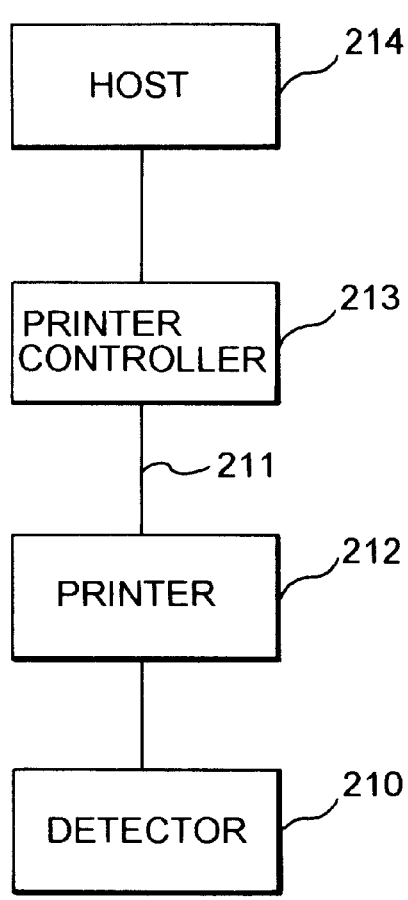
FIGS. 2A and 2B are block diagrams showing the system configuration of a first embodiment.
Figure 2B:
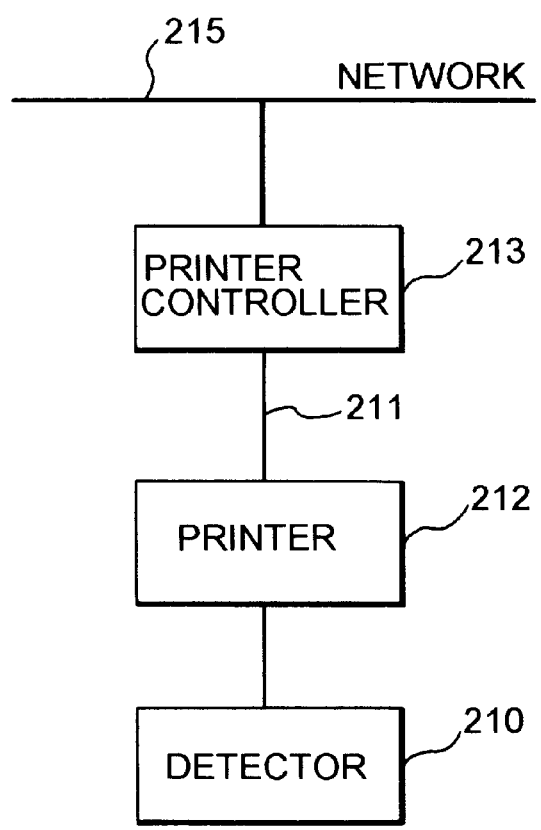

Now reference is made to FIGS. 2A and 2B for explaining the entire configuration. A video I/F 211 executes communication between a printer 212 to be explained later and the printer controller 213, with signals to be explained later in detail. The printer 212 forms the electric image signal received through the video I/F 211 in a visible form, transfers and fixed it onto a recording sheet as the output, and controls various loads for executing such image forming sequence by means of a detector 210. It also detects the state of the printer 212 and informs such state to the printer controller 213.

The printer controller 213 receives the data transferred from the host computer 214 (FIGS. 2A and 2B) or through the network 215 (FIG. 2B). The data are transferred in the format of a page description language (PDL), and developed in a memory into a raster-format data, which are transferred to the printer 212. The data prepared in the host computer 214 can thus be outputted to the printer.

In the following there will detailedly explain the video I/F 211 connecting the printer controller 213 and the printer 212.

Referring to FIG. 3, an engine controller (DC controller) 202 controls a printer engine provided inside the printer 212. Between the printer controller 213 and the engine controller 202 there are exchanged signals shown in FIG. 3.

FIG. 4 is a list of the signals of the video I/F 211, among which representative ones shown in FIG. 3 will be explained in the following.

A /PPRDY signal 303 indicates, after the start of power supply to and the initialization of the printer, that the communication with the printer controller 213 is enabled.

A /RDY signal 305 indicates that the printing operation is enabled in the engine controller 202 by a print start instruction (/PRNT signal to be explained later) from the printer controller 213. The /RDY signal 305 becomes true only when the proper function state is achieved by the various units of the printer, such as that the fixing unit in at a predetermined temperature, that the recording sheet does not remain in the printer, that the polygon mirror is rotated at a predetermined speed etc.

A /PRNT signal 306 is used, by the printer controller 213, for instructing the start or continuation of the printing operation to the engine controller 202.

A /TOP signal 307 is a synchronization signal used as the reference for vertical scanning of the image and transferred from the engine controller 202 to the printer controller 213. The /TOP signal 307 is outputted after a predetermined time from the output of the /PRNT signal 306 from the printer controller 213.

A /LSYNC signal 308 is a synchronization signal used as the reference for horizontal scanning by the printer controller 213, and, like the /TOP signal 307, is outputted after a predetermined time from the output of the /PRNT signal 306 from the printer controller 213.

A /VCLK signal 309 is a synchronization clock signal for /VDOEN and /VDO signals to be explained later, released from the printer controller 213 with a frequency corresponding to the image signal.

A /VDOEN signal 210 controls fetching of the image signal, released from the printer controller 213, into the engine controller 202. The engine controller 202 detects whether this signal is TRUE or FALSE in synchronization with the /VCLK signal 309, and the fetching is executed or not respectively when this signal is TRUE or FALSE.

A /VDO signal 311 is image data. The printer controller 213 outputs this signal in synchronization with the /VCLK signal 309, utilizing the /TOP signal 307 as reference in the vertical direction and the /LSYNC signal 308 as reference in the horizontal direction.

A /CCLK signal 312 is a synchronization clock signal outputted from the printer controller 213 in case the printer controller 213 transfers a serial command to the engine controller 202 or in case the engine controller 202 returns a serial status to the printer controller 213.

A /CBSY signal 313 is used by the printer controller 213 to indicate to the engine controller 202 that a serial command is transmitted by a /CMD signal to be explained later.

A /CMD signal 314 is used in case of transmission of serial information by the printer controller 213 to the engine controller 202, the serial information being called a command.

A /SBSY signal 315 is used by the engine controller 202 to indicate to the printer controller 213 that a serial status is transmitted by a /STS signal 316.

A /STS signal 316 is used in case of transmission of serial status by the engine controller 202 to the printer controller 213, the serial information being called a status.

A /CCRT signal 317 is used for informing a status change in the printer to the printer controller 213. In response to this signal, the printer controller 213 issues, by the /CMD signal 314, a command inquiring the parameter changed in the engine, and the engine controller 202 replies the changed parameter by the /STS signal 316.

In the following there will be explained the printer controlled by the engine controller 202 with reference to FIG. 5, which is a cross-sectional view showing the internal configuration of the printer of the first embodiment.

Figure 5:
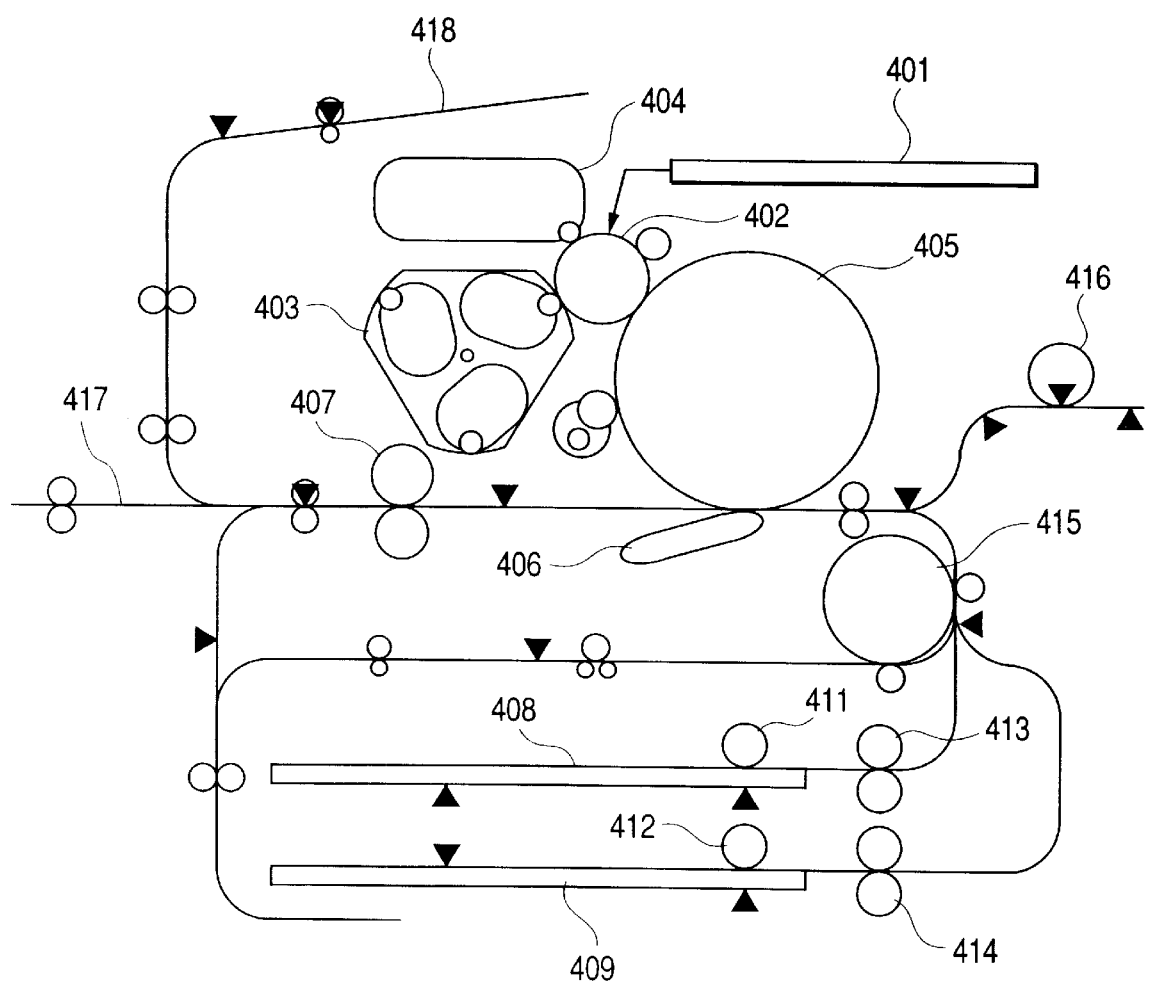
FIG. 5 is a cross-sectional view showing the internal configuration of a printer of the first embodiment.

Referring to FIG. 5, a scanner 401 receives the /VDO image signal 311 transferred from the printer controller 213, converts the signal into a laser beam for irradiating a photosensitive member 402 thereby forming an image thereon. The photosensitive member 402 rotates counterclockwise to reach a color developing unit 403 and a black developing unit 404 which deposit toner onto the photosensitive member 402 according to the charge formed thereon. The image formed on the photosensitive member 402 is then transferred onto a clockwise rotating intermediate transfer member 405. The image formation is completed by a turn of the intermediate transfer member 405 in case of a black-and-white image, or four turns thereof in case of a color image.

On the other hand, the recording sheet fed from an upper cassette 408 or a lower cassette 409 by a pick-up roller 411 or 412 is transported by feed rollers 413 or 414 and is further transported by a transport roller 415 to a position in front of registration rollers.

The sheet feeding is so controlled that the sheet reaches the nip between the intermediate transfer member 405 and a transfer belt 406 at a timing when the image formation is completed on the aforementioned intermediate transfer member 405. The transfer belt 406 is brought into contact with the intermediate transfer member 405 when the recording sheet arrives, whereby the toner is transferred onto the recording sheet. The image transferred onto the recording sheet is fixed thereto by heat and pressure applied by a fixing roller 407.

The recording sheet bearing the fixed image is transported and discharged either to a face-up discharge exit 417 or a face-down discharge exit 418 designated in advance by the printer controller 213. The above-explained configuration allows outputting the image information transferred from the printer controller 213.

Figure 6:
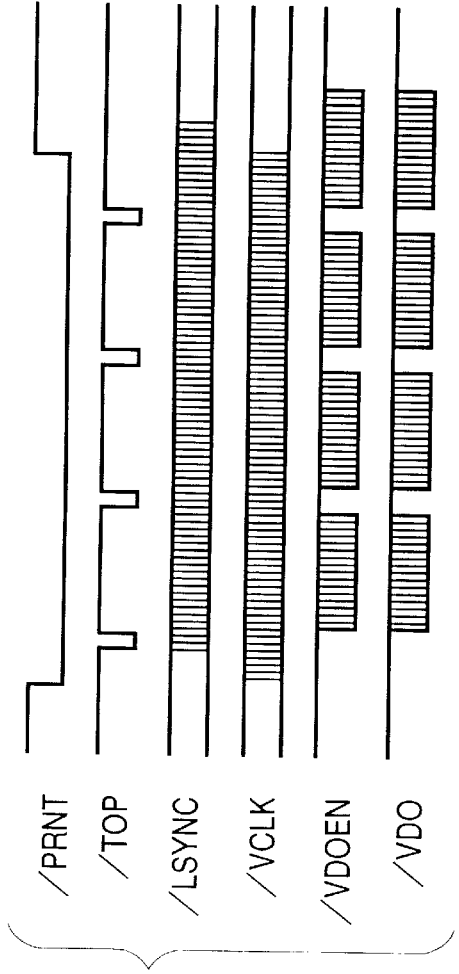
FIG. 6 is a timing chart showing forms of signals exchanged by the video I/F.

The timing of the signals exchanged by the video I/F 215 is shown in FIG. 6, which shows change in time of the signals.

When the image information becomes ready in the printer controller 213, the /PRNT signal 306 to the engine controller 202 is shifted to the low-level (true) state. At the same time the image synchronization /VCLK signal 309, used for image transfer, is generated.

In response, the engine controller 202 executes various settings in the printer, and, when it becomes ready for receiving the image, the engine controller 202 sends the /TOP signal 307 and the /SYNC signal 308 to the printer controller 213. In synchronization with the vertical sync /TOP signal 307 and the horizontal sync /LSYNC signal 308, the printer controller 213 transfers the image /VDO signal 311 and the image enable /VDOEN signal 310 to the engine controller 202.

Figure 7:
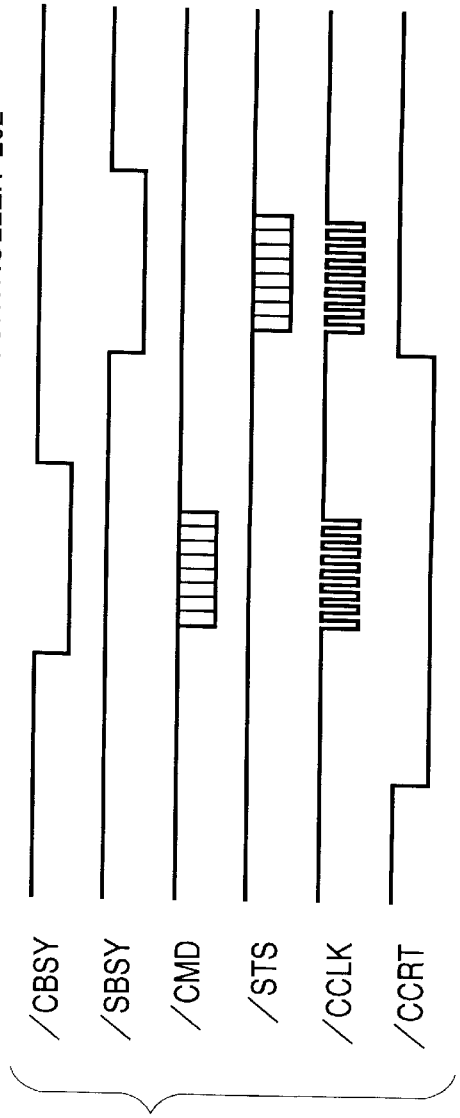
FIG. 7 is a timing chart showing forms of signals in serial communication.

In the following there will be explained the exchange of commands and status signals by the serial communication in the course of such printing operation. FIG. 7 shows the timing of communication between the printer controller 213 and the engine controller 202.

At first there will be explained a case of not using the lowermost /CCRT signal 317. In case the printer controller 213 issues a command to the engine controller 202, the /CBSY signal 313 is shifted to the low-level (true) state, and the command data are transferred by the /CMD signal 314 in synchronization with the clock /CCLK signal 213. In response, the engine controller 202 at first confirms that the /CBSY signal 313 is in the high-level (false) state, then shifts the /CBSY signal 315 to the low-level (true) state, and sends the status data of the engine, corresponding to the command, by the /STS signal 316 in synchronization with the /CCLK signal 312 generated by the printer controller 213. The printer controller 213 receives the status data and accordingly continues or interrupts the print control.

In the following there will be given an explanation on the /CCRT signal 317. This signal is shifted to the low-level (true) state in case a change is generated in an engine state designated in advance by the printer controller 213. It is assumed, as an example, that the printer controller 213 in advance sets the /CMD signal 314 as to enable the /CCRT signal 317 in case of absence of the recording sheet. There is considered a case that only one recording sheet remains and that the printer controller 213 issues a request for two prints. The first print is properly processed by the printing sequence. However, as the second recording sheet is absent, the printer engine 216 detects the change of the state at the start of second image forming cycle, and shifts the /CCRT signal 317 from the high-level state to the low-level state. This signal is transmitted to the printer controller 213. In response, the printer controller 213 issues a command, requesting the status indicating the sheet presence/absence in the sheet feeding unit, to the engine controller 202, in order to identify the sheet cassette in which the recording sheet is absent. In response, the engine controller 202 returns a status, indicating the cassette in which the sheet is absent, to the controller. The /CCRT signal 317 is cleared to the high-level state when the /SBSY signal 315 for returning the status is shifted to the low-level state.

Figure 21:
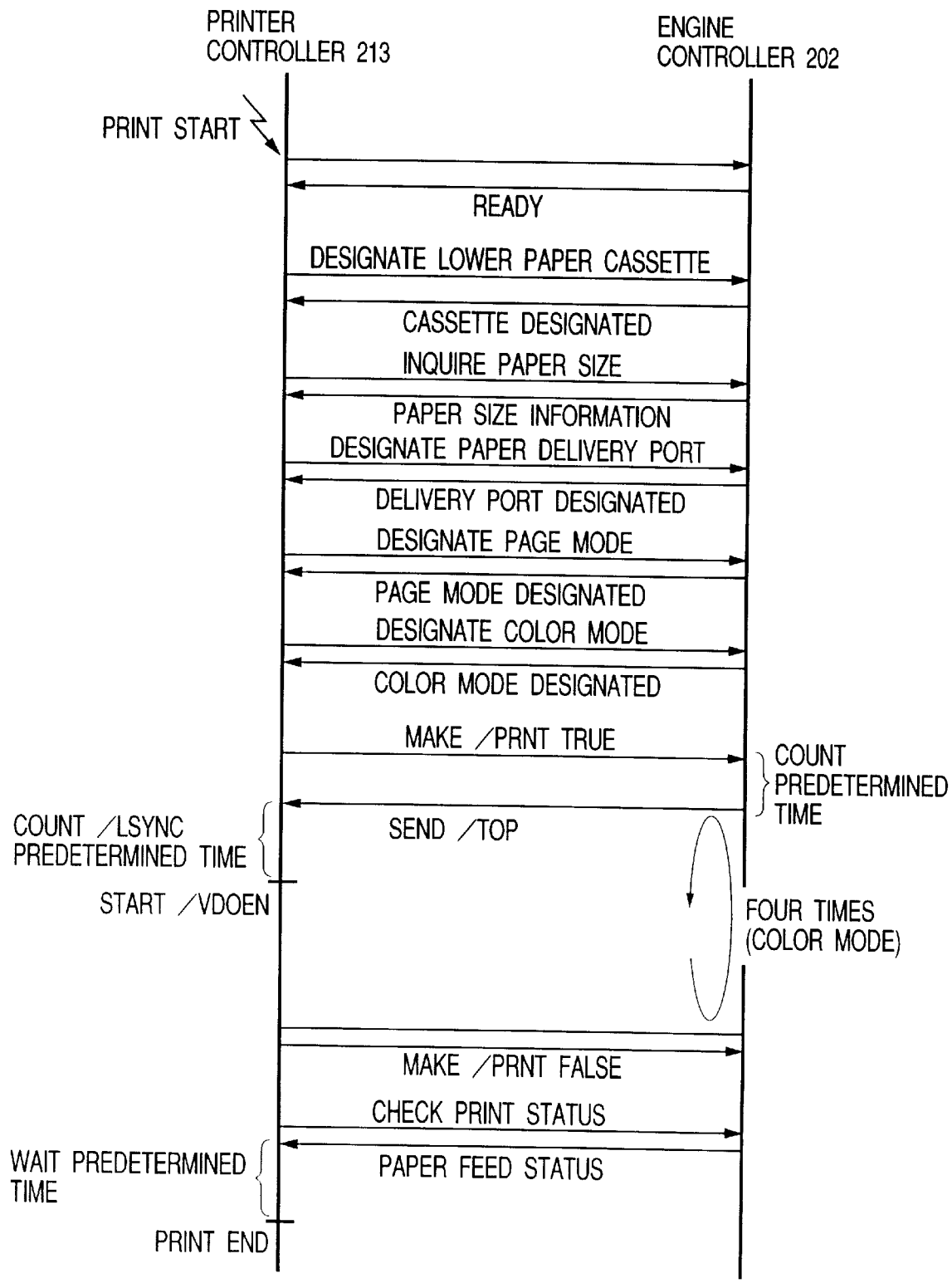
FIG. 21 is a view showing a serial communication in the course of a printing operation.

Now reference is made to FIG. 21 for explaining the command/status exchange between the printer controller 213 and the engine controller 202 in the course of the printing operation. In the following there is assumed a case of a color image output.

When a request for starting the printing operation is generated, the printer controller 213 executes the conversion of the image data and checks, to the engine controller 202, whether the printer is ready. It then issues a command designating the sheet feeding cassette, and issues a command request the sheet size in the designated sheet cassette. The engine controller returns status signals corresponding to these commands.

The printer controller 213 issues a command for designating the discharge exit, thereby determining the sheet discharging exit, and issues a page mode designating command for designating the number of pages to be formed. Finally it issues a command for designating monochromatic or color image, whereby all the settings in the printer are completed.

Then the printer controller 213 issues a print request /PRNT signal 306 to the engine controller 202, which in response returns the /TOP signal 307 at a predetermined time. The image is transferred to the engine controller 202 by the /VDO signal 311, in synchronization with the /VCLK signal 309, also in synchronization in the vertical direction with the /TOP signal 307 and in the horizontal direction with the /SYNC signal 308. As the color mode is assumed in the present case, the /TOP signal 307 is generated four times to generate images of four colors CMYK.

After the generation of the last /TOP signal 307, the /PRNT signal 306 is returned to the high-level (false) state. Thus the engine controller 202 detects that the print request has been terminated, and shifts to a post-process such as cleaning of the intermediate transfer member 405. After the transfer step, the recording sheet passes the fixing roller and is discharged to the designated discharge exit. Finally, after confirming that the engine controller 202 is not in the transportation of the recording sheet (sheet discharge being completed), the printer controller 213 terminates the printing operation and waits in the ready state until the next print request is generated.

In the course of the above-described operations, if there is generated an illegal state such as the absence of recording sheet explained above or the opening of the door by the user, the abnormal state in the printer is immediately transmitted from the engine controller 202 to the printer controller 213, which in response executes a responsive process.

In the foregoing there has been explained the process executed between the printer controller and the printer (engine controller).

Figure 8:
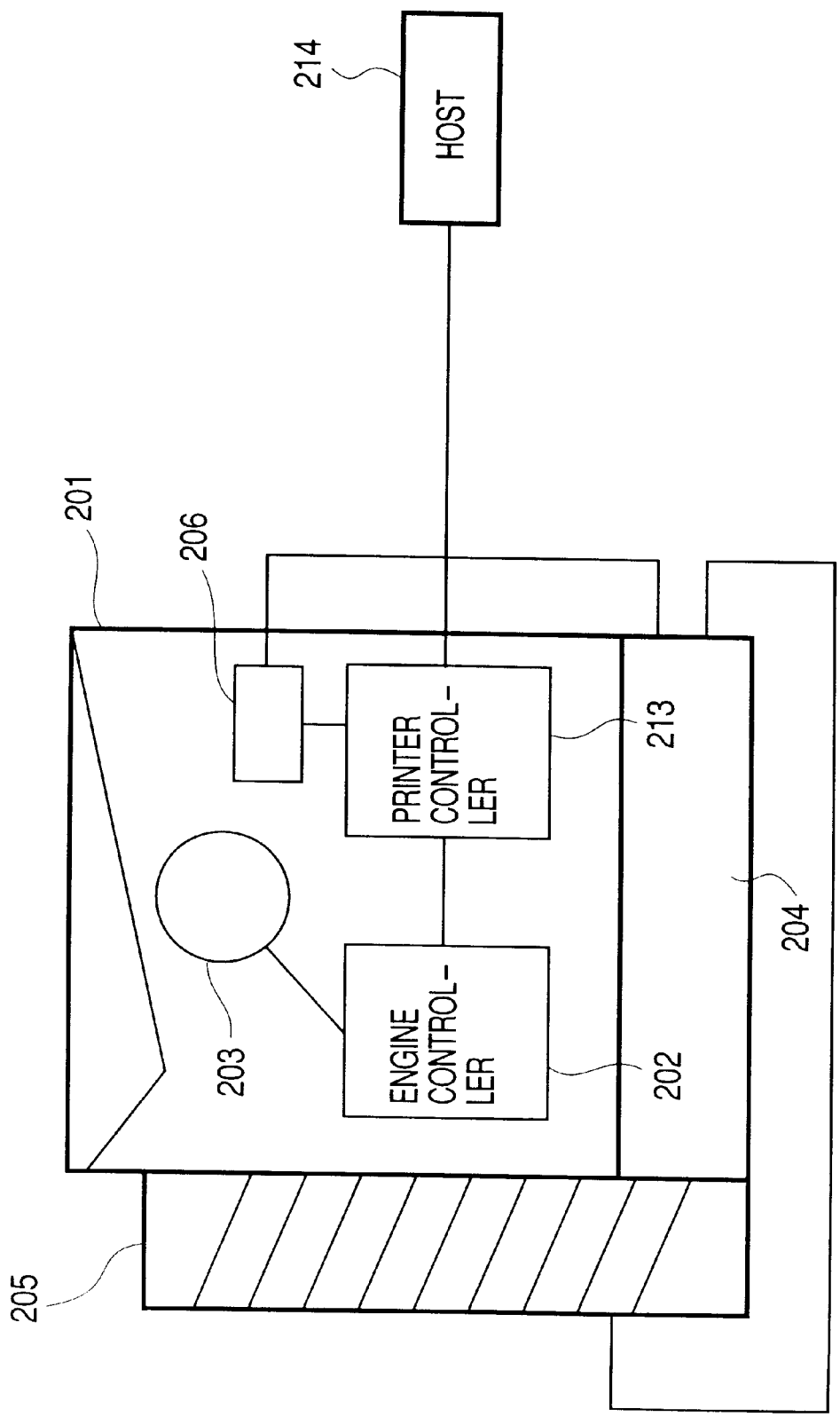
FIG. 8 is a block diagram showing principal configuration of a printing apparatus of the first embodiment.

FIG. 8 is a block diagram showing the principal configuration of a printing apparatus having the above-described electrical configuration. In FIG. 8, there are provided a printer main body 201, an engine controller 202 for controlling sheet transportation in the printer and image formation therein, an image forming unit 203, a printer controller 213 as shown in FIGS. 2A and 2B, incorporated in the printer main body 201 as shown in FIG. 8, a host computer 214 connected one-to-one or through a network 215 to the printer controller 213, an optionally addable sheet cassette deck 204, an optionally addable sorter 205, and an option controller 206 for controlling the optional cassette deck 204 and the optional sorter 205.

Figure 9:
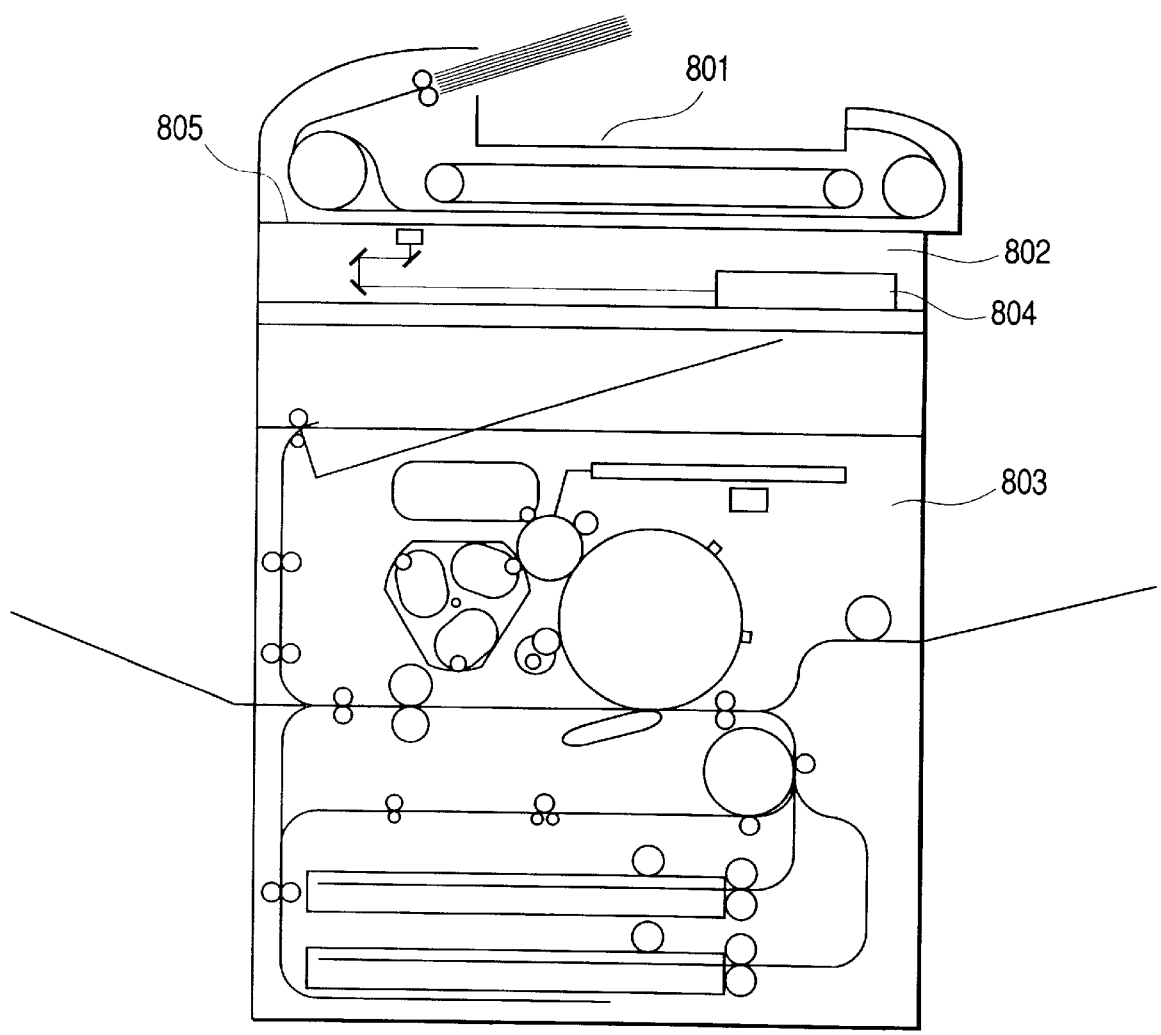
FIG. 9 is a cross-sectional view showing the internal configuration in case a reader controller is mounted.
Figure 10A:
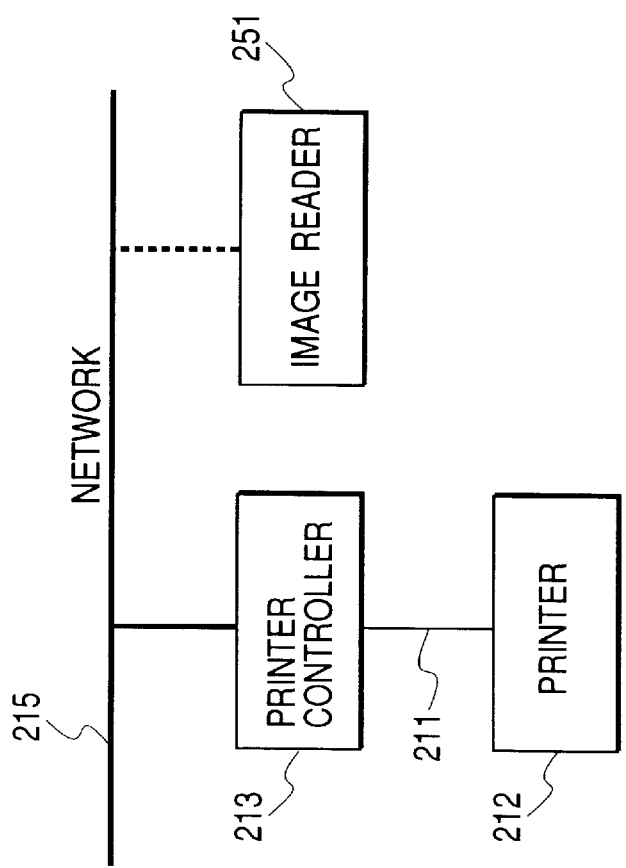
FIGS. 10A, 10B and 11 are block diagrams showing the system configuration in case a reader is mounted.
Figure 10B:
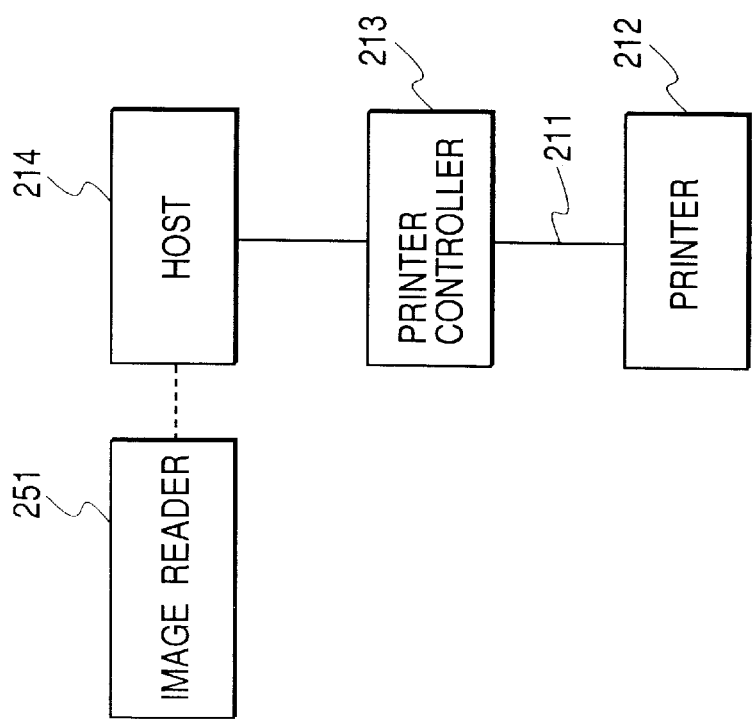
Figure 11:
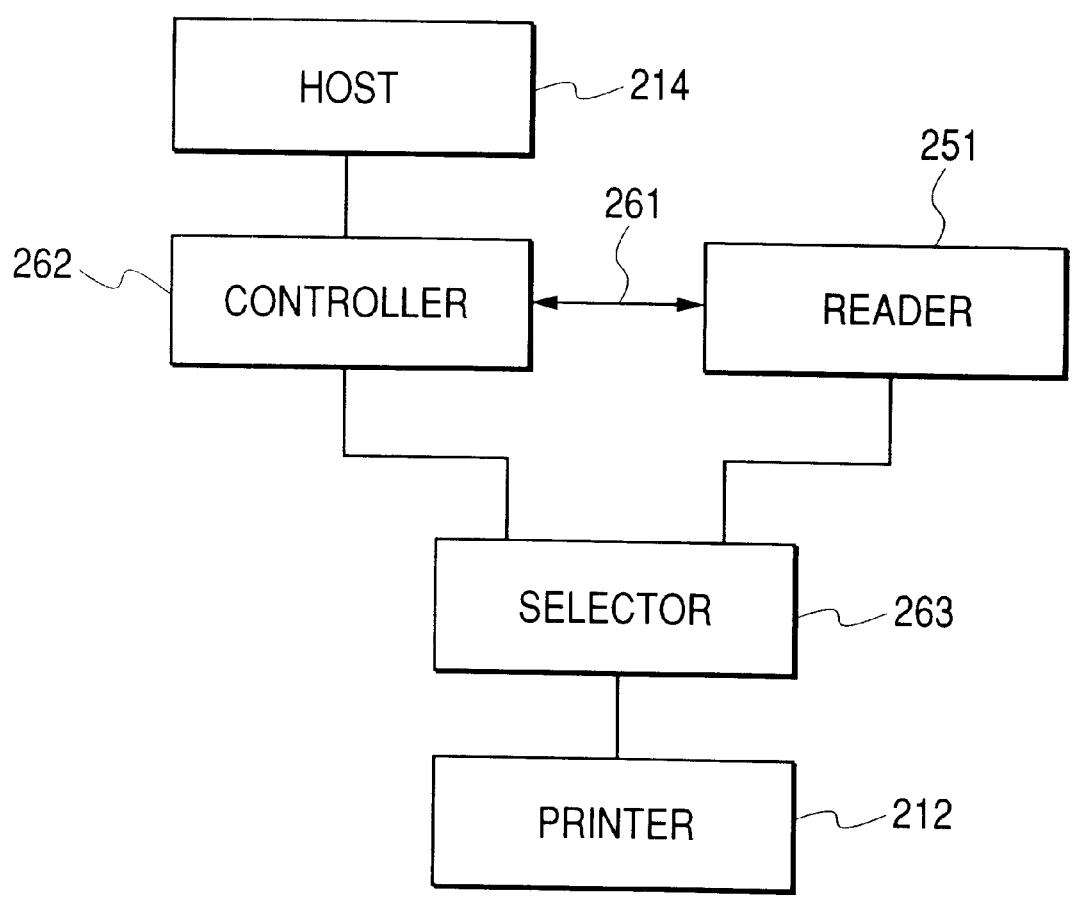

FIG. 9 is a cross-sectional view showing the internal configuration of the above-described printing apparatus, provided with a reader controller for outputting not only the image data released from the printer controller 213 based on the data transferred from a computer but also digital data obtained by converting an optically read original image of an original. FIGS. 10A, 10B and 11 are block diagrams showing the system configuration when such reader controller is incorporated.

In FIG. 9, there are shown an original feeder 801 for transporting the original to a position for optical image reading, an optical reading device 802, and an original table 805 constituted by a glass plate. The original feeder 801 is driven in synchronization with the optical reading device 802. When the original image is moved on the original table 805 by the original feeder 801, the optical reading device 802 scans the image by a movement in the lateral direction in illustration, and sends the reflected light, after suitable optical processing, to a photoelectric converting unit 804. There is also shown a printer main body 803.

Figure 12:
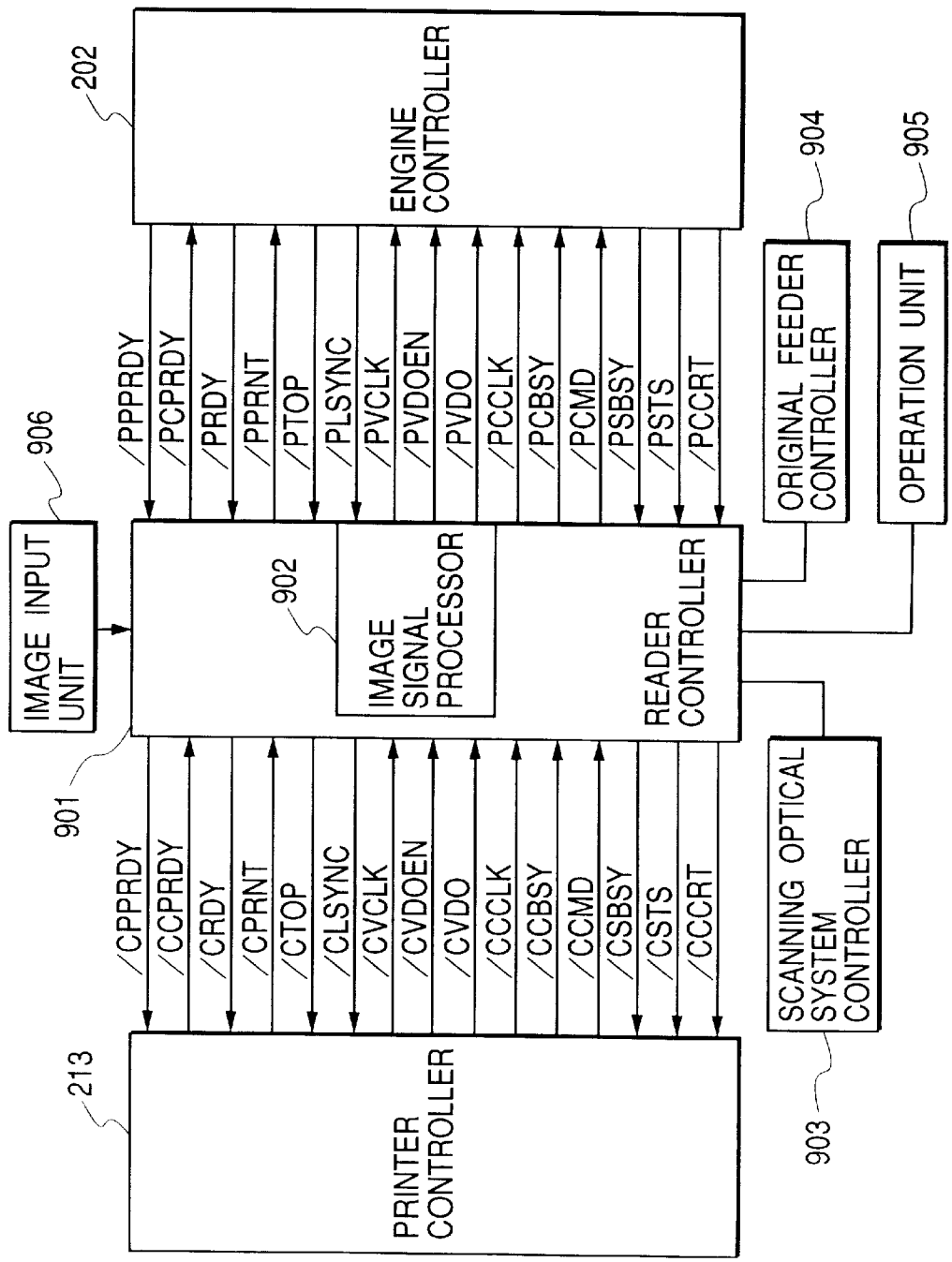
FIG. 12 is a block diagram showing the connection configuration between a printer controller and an engine controller.

FIG. 12 shows the electrical connections when the reader controller for reading the original image is added to the configuration shown in FIG. 3 in which the printer controller 213 and the engine controller 202 are connected.

In FIG. 12, a reader controller 901 is provided electrically between the printer controller 213 and the engine controller 202 shown in FIGS. 2A and 2B. The signal lines between the printer controller 213 and the reader controller 901 and between the engine controller 202 and the reader controller 901 have the same functions as those in FIG. 3. However, the signals to and from the printer controller 213 are physically different from those to and from the engine controller 202, so that the former ones are identified by a prefix C while the latter ones are identified by a prefix P. There are also shown an image signal processing unit 902, an original scanning optical system control unit 903 for controlling the optical reading unit 802, an original feeding control unit 904 for controlling the original feeder 801, an operation unit 905, and an image input unit 906. The image signal converted in the photoelectric conversion unit 804 is entered from the image input unit 906 and is transferred to the image signal process unit 902 in the reader controller 901.

Figure 13:
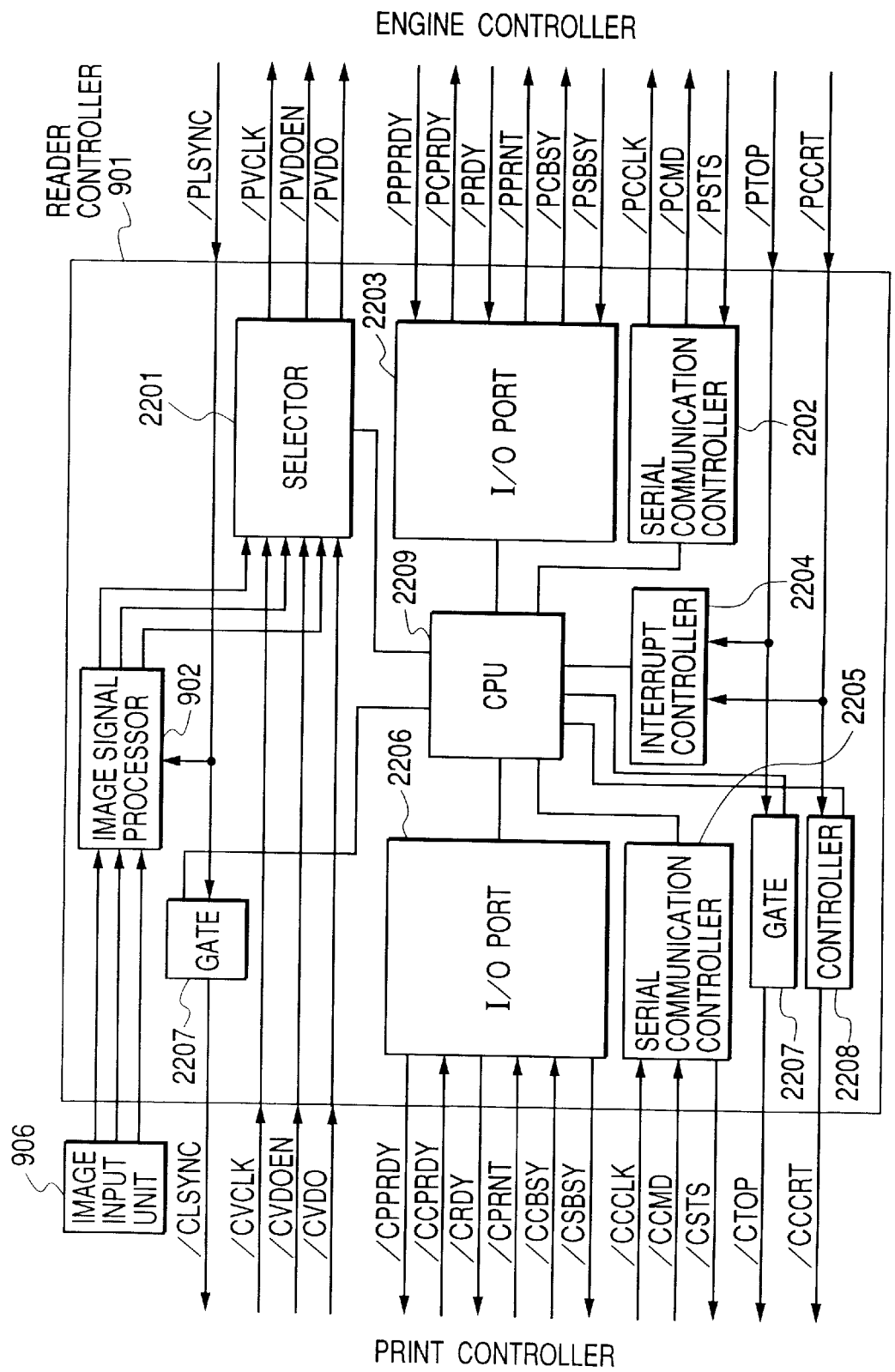
FIG. 13 is a block diagram showing the configuration of a reader controller.

The internal configuration of the reader controller is shown in FIG. 13.

In FIG. 13, there are shown a reader controller 901 shown in FIG. 12, an image process unit 902 shown in FIGS. 10A and 10B, and an image input unit 906 shown in FIG. 12. A selector 2201 selects either the outputs of the image process unit 902 or the signals transferred from the printer controller 213, for supply to the engine controller 202. The signals switched by the selector 2201 are the image clock /VCLK signal 309, the image enable /VDOEN signal 310 and the image data /VDO signal 311. There are also shown a serial communication controller 2202 for executing communication with the engine controller 202, an input/output port 2203 for exchanging signals for complementing the communication in the communication controller 2202, an interruption controller 2204 receiving the image front end request signal /PTOP and the printer status change signal /PCCRT, and a serial communication controller 2205 for executing communication with the printer controller.

An input/output port 2206 executes exchange of signals complementing the communication in the communication controller mentioned above. A gate 2207 controls whether the signals transferred from the printer are to be transmitted to the printer controller. Such gate control is executed on the image front end request /TOP signal 307 and the line sync /LSYNC signal 308. A control circuit 2208 having a gate function and a flag setting function controls the printer status change /CCRT signal 317. By opening or closing a gate, it controls whether the printer status change signal /PCCRT issued by the engine controller 202 is transmitted to the printer controller, and it allows, by setting a flag, the reader controller to send the printer status change signal /CCRT to the printer controller. A CPU 2209 controls the entire circuitry.

In the following discussion there will be explained the process of reading a full-color original image and outputting such image from the image forming apparatus, utilizing these components. When an unrepresented copy start key is actuated in the operation unit 905, the reader controller closes the gate 2207 and the signal control circuit 2208 for the copying mode, and sets the selector 2201 so as to select the outputs of the image process unit 902. Then the reader controller checks the ready signal /PRDY 303 with the engine controller 202 through the input/output port 2203, and executes various settings by the serial communication controller 2202. At first it issues the command for designating the sheet cassette, and issues the command requesting the sheet size in the designated sheet cassette, and, in response, the engine controller 202 returns the corresponding status signals.

Then the printer controller 213 issues the command for designating the discharge exit, thereby determining the sheet discharging exit, and issues the page mode designating command for designating the number of pages to be formed. Finally it issues the command for designating monochromatic or color image, whereby all the settings in the printer are completed.

After the original is fed onto the original table by the original feeder 801, the reader controller issues the print request /PRNT signal 306 to the engine controller 202, which in response returns the /PTOP signal after a predetermined time. This signal is processed by the interruption controller 2204 whereby the optical reading unit 802 is operated in synchronization with the /PTOP signal. The image entered from the photoelectric converting unit 804 to the image process unit 902 is transferred to the engine controller 202 by the /PVDO signal, in synchronization with the /VCLK signal, also in synchronization in the vertical direction with the /TOP signal and in the horizontal direction with the /SYNC signal. As the color mode is assumed in the present case, the /TOP signal is generated four times to generate images of four colors CMYK.

After the generation of the last /PTOP signal, the /PPRNT signal is returned to the high-level (false) state. Thus the engine controller 202 detects that the print request has been terminated, and shifts to a post-process such as cleaning of the intermediate transfer member 405. After the transfer step, the recording sheet passes the fixing roller and is discharged to the designated discharge exit. Finally, after confirming that the engine controller 202 is not in the transportation of the recording sheet (sheet discharge being completed), the printer controller 213 terminates the printing operation and waits in the ready state until the next print request is generated.

In the following discussion there will be explained a process of outputting the image, from the printer controller 213, by the image forming apparatus. At the termination of the copying operation, the reader controller is in the ready state. In this state, the reader controller opens the gate 2207 and the signal control circuit 2208 for the printing operation. The reader controller checks the ready signal /PRDY with the engine controller 202 through the input/output port 2203, and if the signal is ready, it sets the printer ready signal /CRDY in the printer controller 213 through the input/output port 2206.

Then the printer controller 213 executes communication for executing various settings, and the communication is received by the reader controller through the serial communication controller 2205 and analyzed by the CPU 2209. According to the content of the communication, the reader controller executes various settings with the serial communication controller 2202. In response to the commands, the engine controller 202 returns the corresponding status signals, which are received by the reader controller through the serial communication controller 2202 and are analyzed by the CPU 2209. Then the communication is made to the printer controller 213 utilizing the serial communication controller 2205.

Then the printer controller 213 sends, to the reader controller, the print request /CPRNT signal, in response to which the reader controller sends the print request /PRNT signal to the engine controller 202. In response, the /PTOP signal is returned from the engine controller 202 after a predetermined time. This signal is transmitted by the gate control circuit 2208 and is returned as the /CTOP signal to the reader controller. The reader controller transfers the /CVDO signal in synchronization with the /CVCLK signal, also in synchronization in the vertical direction with the /CTOP signal and in the horizontal direction with the /CLSYNC signal obtained from the /PLSYNC signal by passing the gate controller 2207. In the reader controller, the selector 2201 is so set as to select the signals transferred from the printer controller 213, and the signals from the printer controllers are transferred to the engine controller 202 as the signals /PVCLK, /PVDOEN and /PVDO.

In the following discussion there will be explained the difference in the timing of image transmission, between the printing operation and the copying operation.

The configuration of the printer controller 213 will not be explained in detail, but there is provided an internal memory, in which the image data to be printed are prepared in advance. Consequently, in response to the image front end request signal /TOP transferred from the engine controller 202, the time required for outputting the print data /VDO 311 is limited to the electrical delay time.

Figure 14:
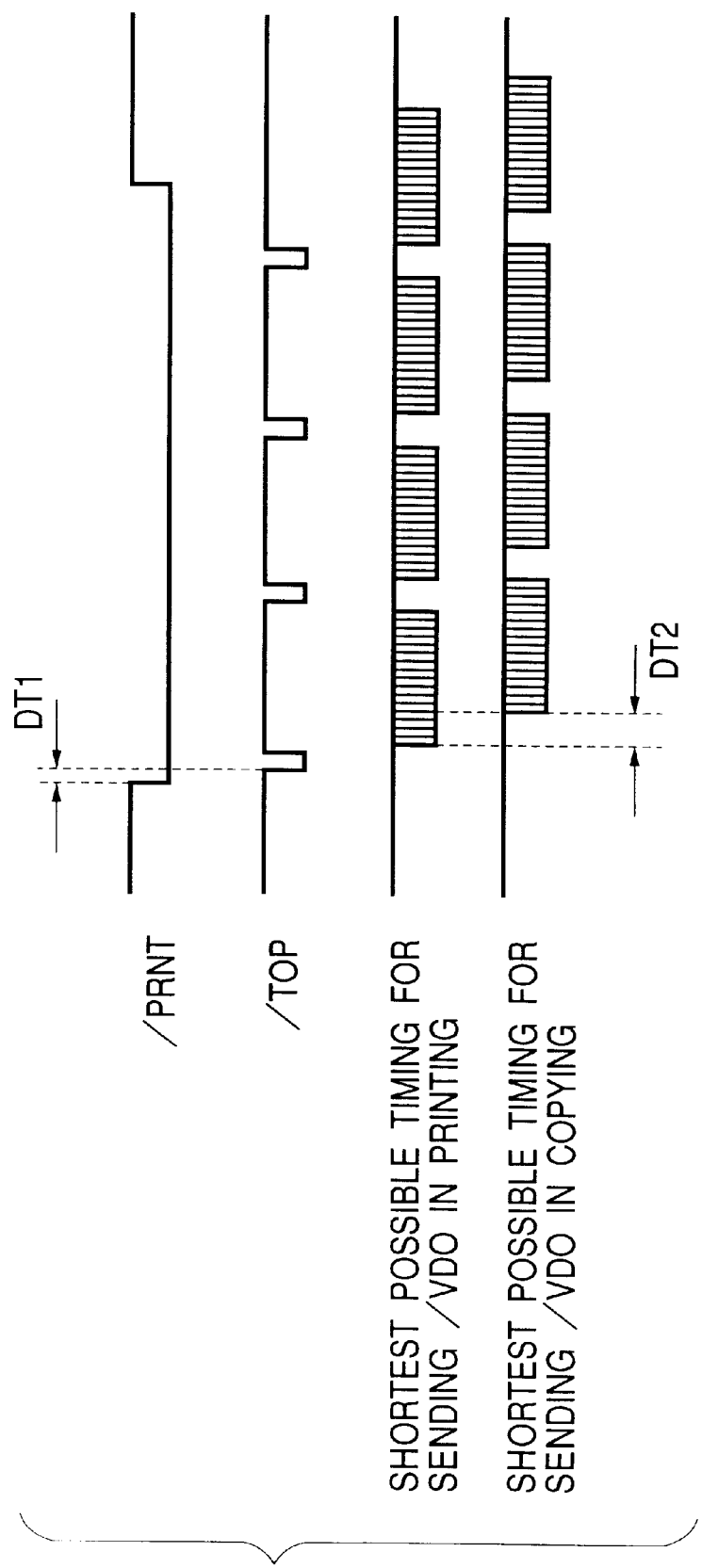
FIG. 14 is a timing chart showing the difference in timing between a copying operation and a printing operation.

On the other hand, in the copying mode, the image data are outputted by reading the original with the movement of the optical reading unit 802. From the stopped state thereof to the high-speed moving state for original reading, there is required an accelerating time of several hundred milliseconds as shown in FIG. 14. Consequently, if the engine controller 202 releases the image front end request signal /TOP 307 for the copying mode at the same timing as the /TOP signal for the printing mode, the print data /VDO 311 are delayed by several hundred milliseconds in case of the copying mode. For resolving this drawback, there can be conceived following two methods:

1) outputting the /TOP signal earlier in the copying mode than in the printing operation; or
2) providing another signal (RSTART) for the copying mode.

Figure 15:
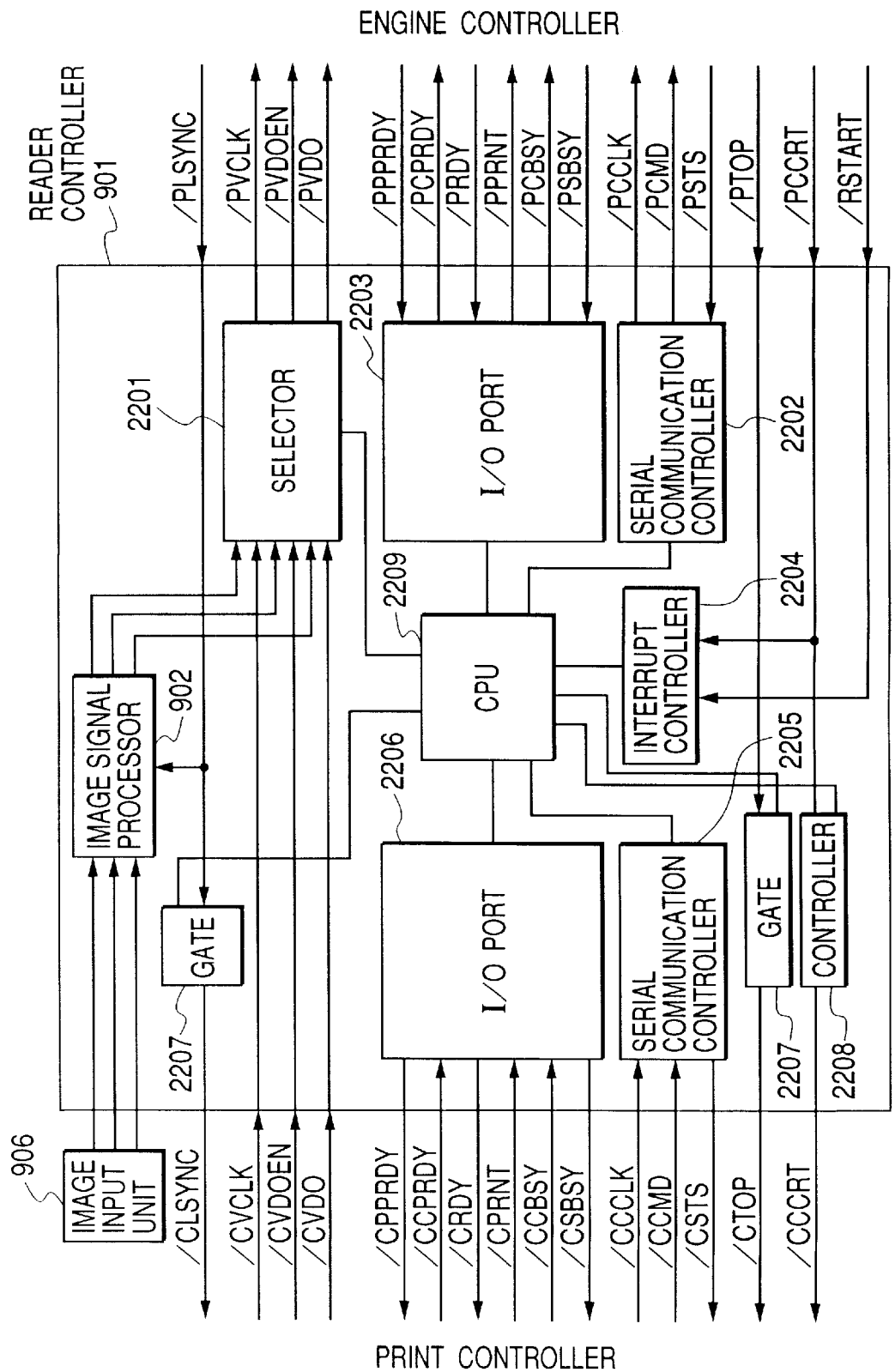
FIG. 15 is a block diagram showing the configuration of a reader controller.

For the method 1, the configuration of the reader controller need not be changed, and, in the copying mode, the reader controller starts the movement of the original reading unit 801 by the /TOP signal 307. For the method 2, the configuration may be modified as shown in FIG. 15, in which the image front end request signal /PTOP from the engine controller 202 is required only in case the printer controller executes the printing operation and need not be supplied to the interruption controller 2204 of the reader controller. Also the reader start request signal /RSTART from the engine controller 202 is required only in the copying mode and need not be supplied to the printer controller 213.

In the following discussion there will be explained control on the setting commands.

Because of the connection of the reader controller 901 between the printer controller 213 and the engine controller 202, the communication therebetween is executed in the following manner.

In the following there will be explained a case in which a setting command such as a sheet cassette changing command is issued from the printer controller 213 to the printer, while the reader controller 901 reads and outputs the original image utilizing the engine controller (copying mode).

Figure 16B:
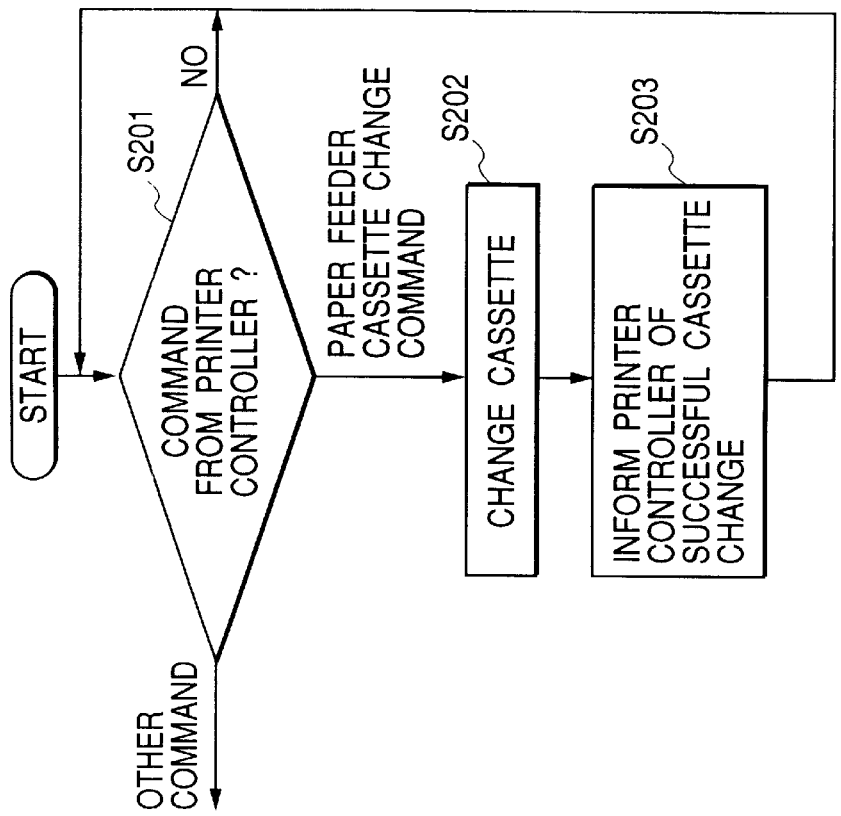
FIGS. 16A and 16B are flowcharts showing the communication sequence in case the reader is not mounted.
Figure 16A:
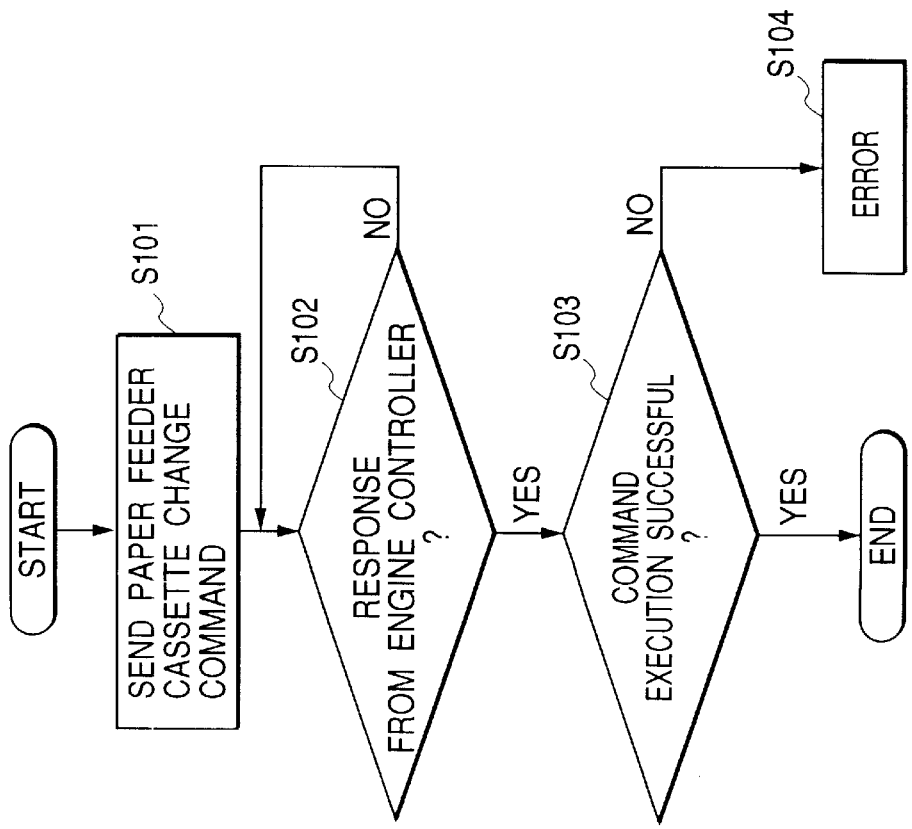

FIGS. 16A and 16B show a command issuing sequence in the configuration shown in FIG. 3, in which the reader controller is absent. FIG. 16A shows the sequence in the printer controller while FIG. 16B shows the sequence in the engine controller 202. The printer controller 213 issues a sheet cassette changing command (step S101), then awaits the response from the engine controller 202, then, upon receiving the response (step S102), and discriminates whether the command has been successful (step S103), whereby the command issuing sequence is terminated. If the command has failed, a step S104 executes an error process. The engine controller 202, in response to the command from the printer controller, judges the content of the command (step S201), and, in case of the sheet cassette changing command (step S202), it informs the successful execution of the command to the printer controller 213 when the change is successfully made (step S203).

On the other hand, FIGS. 17A and 17B show the control sequence in case the reader controller is inserted. In this case, the control sequences of the printer controller 213 and the engine controller 202 are identical with those shown in FIGS. 16A and 16B.

FIG. 17B shows the sequence for receiving the command from the printer controller 213 and returning the status thereto. The reader controller 901 receives the command by the serial communication controller 2205, from the printer controller 213 through the /CCMD signal line shown in FIG.

12 (step S401), and discriminates whether such command can be directly issued to the engine controller 202 (step S402). In case the reader controller 901 is not currently executing any command to the engine controller 202 for example for the copying mode, a command same as that from the printer controller 213 is issued to the engine controller 202 through the /PCMD signal line, utilizing the serial communication controller 2202 (step S403). On the other hand, in case the copying operation cannot be normally executed if the sheet cassette changing command from the printer controller 213 is directly issued to the engine controller 202, for example during the copying operation with the sheet cassette designation by the reader controller 901, the reader controller 901 does not issue the command to the engine controller 202 but accumulates the command in an engine command cue which stores the commands to the engine controller 202 in the order of issuance (step S404). As a response has to be returned to the printer controller 213, the reader controller 901 returns a pseudo success command (step S406) to the printer controller 213 by a response through the /CSTS signal line, utilizing the serial communication controller 2205 (step S407).

Now reference is made to FIG. 17A, for explaining a case where the reader controller 901 has become capable, without influencing the state thereof, of issuing the command, received from the printer controller 213, to the engine controller 202. When such state is reached (step S301), the reader controller 901 issues, to the engine controller 202, the command accumulated in the engine command cue through the /PCMD signal line, utilizing the serial communication controller 2202 (step S302), and awaits the response (step S303). The command issued by the reader controller 901 itself is also transferred to the engine controller 202 through the /PCMD signal line. The command is successfully executed (step S304), the engine controller 202 returns the response to the reader controller 901. When the command is successfully executed, it is deleted from the engine command cue (step S305).

If the failure of command execution in the engine is identified, there is executed a process for the error state (step S306).

As explained in the foregoing, the command processing sequence can be executed without mismatching in the operation in issuing ordinary commands from the printer controller 213 to the engine controller 202, even in the presence of the reader controller 901 therebetween.

In the following discussion there will be explained the sequence in the configuration including the reader controller 901, in case a status change in the engine, for example an error state, is transmitted from the engine controller 202 to the reader controller 901 by the /PCCRT.

In case the reader controller is present, the desired status change may be different between the reader controller 901 and the printer controller 213. As an example, there will be considered a status change of jamming of a sheet in transportation.

In case a sheet jamming is generated in the course of copying operation of the engine under the control by the reader controller 901, the information on such state change is desired only by the reader controller 901. The printer controller 213 cannot execute any appropriate post-processing even if such status change is made known, since such sheet jamming is not in the course of data output from the printer controller 213.

Also, if the same control system as in the reader controller 901 is given to the printer controller 213, each controller is given a jam processing software that has to be provided in the other controller, and such overlapping configuration results in a significant waste in the designing work, quality evaluation and software capacity.

Consequently the status change signal is basically given to the printer controller 213 in the printing mode and to the reader controller 901 in the copying mode. However, even in the copying mode, the printer controller 213 may wish the status change signal of the engine. For example the change in the cassette size and the information on the absence of sheet need also to be informed to the printer controller 213. In such informing, the time from the issuance of the status change signal in the engine controller to the processing in respective controller is not critical.

Figure 18:
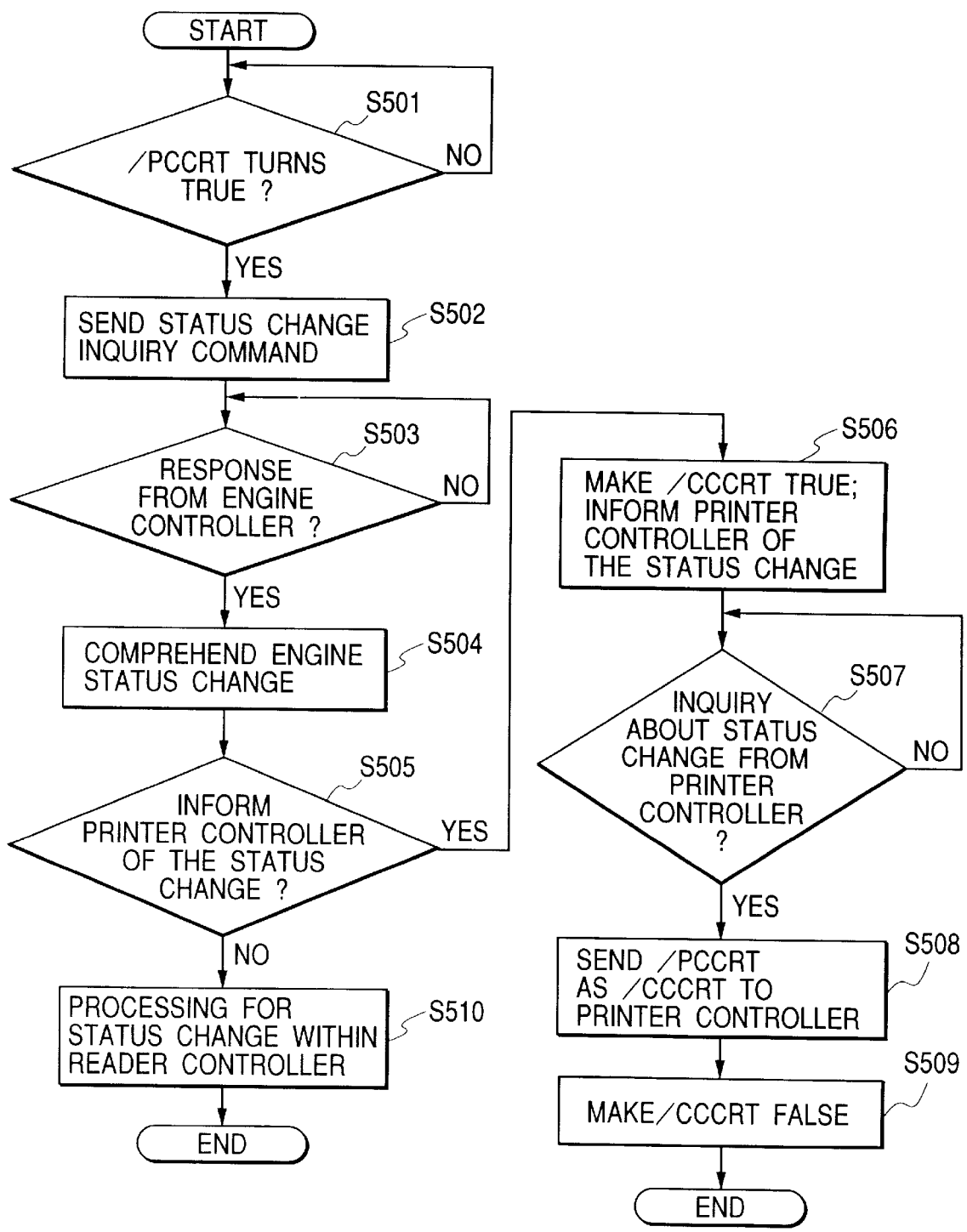
FIG. 18 is a flowcharts showing the process for a state change in CCRT when the reader is mounted.

Consequently there is executed the control explained in the following. In the copying mode in which the reader controller 901 controls the engine controller 202, the status change signal /PCCRT informed from the engine controller is masked to the printer controller 213 by the gate function of the control circuit 2208, and is received only by the reader controller 901 through the interruption controller 2204. The reader controller 901 executes a sequence shown in FIG. 18. When the /PCCRT signal becomes true (step S501), the reader controller 901 issues a command for acquiring the status change to the engine controller 202 (step S502), then identifies the returned status (step S503) and understands the status change in the engine (step S504). Then it discriminates whether the content is to be informed also to the printer controller 213 (step S505). For example, a status change such as the change in the sheet cassette size is to be informed. In case the informing is judged necessary, a flag is set by the control circuit 2208 and the state change signal /CCCRT is generated and transferred to the printer controller 213 (step S506).

In the printing mode in which the printer controller 213 controls the engine controller 202, the gate function of the control circuit 2208 is opened to transmit the state change signal from the engine controller 202 to the printer controller 213 as the state change signal /CCCRT (step S508).

In the following there will be explained the control by the command execution. As an example, there will be explained the control by the reader controller 901 in case requests to use are given to the engine controller 202 simultaneously from the printer controller 213 and the reader controller 901.

FIG. 19 shows the location of data and exchange thereof in case a print request is generated in the course of a copying operation. The engine controller 202 is in the course of imaging formation by receiving the image signal /PVDO from the reader controller 901. In this operation, parameters such as the designation of the sheet cassette, the designation of the sheet discharge exit, the image forming mode etc. have been set, as shown in FIG. 21, by the serial communication between the reader controller 901 and the engine controller 202.

A buffer 1301 for various set parameters stores the values set in the engine controller 202 by the reader controller 901 itself and those set in the engine controller 202 by the printer controller 213. Among the set values in the buffer 1301, those from the reader include the aforementioned designated values. In case a print request is generated from the printer controller 213 in the course of this copying operation, it is hardly acceptable from the standpoint of usability to execute a printout by interrupting the copying operation. Consequently, the print request in this state is suspended until the copying operation is terminated. However, the /CSTS signal has to be returned in response to the /CCMD signal from the printer controller 213. Therefore, among the set values of the buffer 1301, those from the printer are set according to the request, as the set values for PDL. In case the set values from the reader are different from those for PDL, the reader controller 901 may execute setting in the engine controller 202 after the termination of the copying operation and prior to the start of the printing operation. In the following there will be explained a specific example.

It is assumed that a copying operation is in progress with such setting as to feed the recording sheet from the upper cassette and to discharge the sheet to the face-up discharge exit 417 and that the color image forming mode is set, based on the judgment that the original is colored. In case a print request is generated from the printer controller 213, the execution of the printing operation is suspended but various settings can be executed. It is assumed that the print request is to output a black-and-white image by sheet feeding from the upper cassette and by sheet discharge to the face-down discharge exit 418. Thus the upper cassette is designated both by the reader controller 901 and the printer controller 213. Consequently, when the copying operation is terminated and is switched to the printing operation, it is not necessary to issue the sheet cassette designating command to the engine controller 202. However, as the sheet discharge exit and the image forming mode are different between the copying operation and the printing operation, it is necessary to newly issue the commands for designating the sheet discharge exit and the image forming mode from the reader controller 901 to the engine controller 202 when the copying operation is terminated.

As explained in the foregoing, the reader controller 901 executes not only judgment for suspending the execution, in the engine controller 202, of the command received from the printer controller 213 but also judgment for not duplicating the parameters already set in the engine controller 202 by the reader controller 901.

In the following discussion there will be explained, with reference to FIG. 20, a case where a copy request is generated in the course of a printing operation. This case is contrary to the case shown in FIG. 19 from the standpoint of usability, and when the user presses the copy start button on the copying apparatus, it is preferable that the copying operation can be executed as an interruption process, rather than the copying operation is rejected because of the printing operation in progress.

In this situation, the /CVDO signal from the printer controller 213 is selected by the selector 2201 and is transferred as the /PVDO signal to the engine controller 202. It is assumed that the parameters set by the printer controller 213 are the upper cassette, the face-down discharge exit 418 and the black-and-white image mode, same as those in the case of FIG. 19. The engine controller 202 can know the end of the printing operation only when the /PPRNT signal from the printer controller 213 is shifted to the high-level (false) state and does not know the number of printouts. It is assumed also that the printer is going to print four images.

If the copying operation is not requested by interruption from the reader, the engine controller 202 generates four /PTOP signals according to the timing shown in FIG. 6, and the image signal is accordingly transferred from the printer controller 213 to the engine controller 202 through the reader controller 901.

Figure 22:
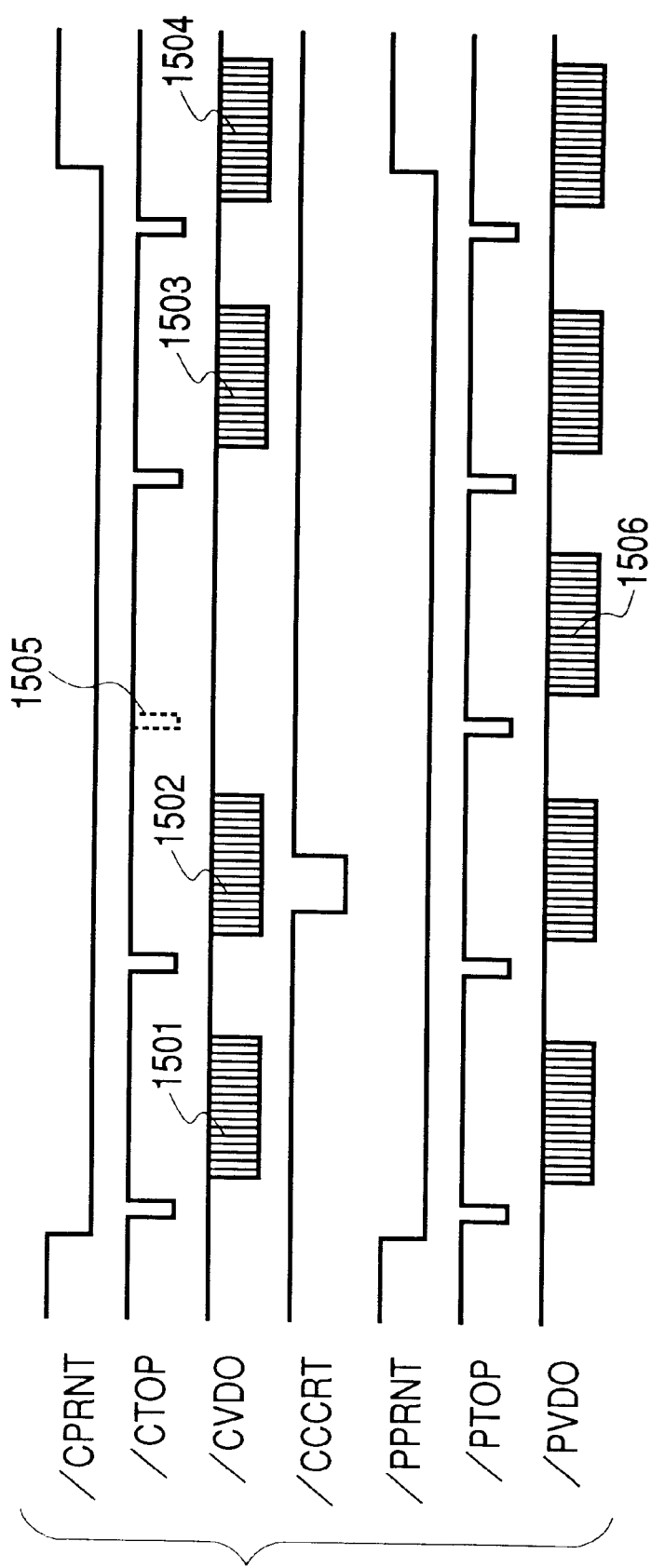
FIG. 22 is a timing chart showing forms of signals in an interruption copying operation.

It is assumed that a copy request, for a single copy of a color original, is generated from the reader controller 901 in the course of the second printout, as shown in FIG. 22. In response to a /CPRNT request command from the printer controller 213, the reader controller 901 issues a /PPRNT request command to the engine controller 202, which in response releases the /PTOP signal, and this signal is supplied through the reader controller 901 to the printer controller 213 as the /CTOP signal. In this manner the printing operation is executed for a first image 1501 and a second image 1502.

In the following there will be explained a case that an interruption copying request is generated by the reader controller 901 in the course of the second printing operation. The reader controller 901 sends the /CCCRT signal to the printer controller 213. This signal does not indicate an actual status change in the engine but is to request the printer controller 213 that the printer engine is released, in order that the reader can acquire the printer engine. This signal is generated by the control circuit 2208 as explained in the foregoing. In response to this signal, the printer controller 213 issues a command for checking the status of the printer engine, and the reader controller 901 in response returns a status that the copying operation is in progress to the printer controller 213.

The printer controller 213 detects that the printer engine is in the course of the copying operation, and awaits the arrival of the /CTOP signal while maintaining the /CPRNT signal in the low-level (true) state. If the copying operation is not in progress, a time-out error is generated after a predetermined time if the /CTOP signal is not received during the low-level (true) state of the /CPRNT signal, but, if the copying operation is in progress, the printer controller 213 is so set as to eliminate the limit time and to perpetually await the CTOP signal. The next /PTOP signal from the engine controller 202 is for executing the copying operation and is utilized in the reader controller 901, and, as shown by 1505, the /PTOP signal from the engine is masked from the printer controller 213.

The image signal generated in the reader controller 90 1 is limited to 1506 only. After the single interruption copying operation, the /PTOP signal is unmasked and supplied as the /CTOP signal to the printer controller 213, whereby the images 1503 and 1504 from the printer controller 213 can be printed in the engine controller 202. The above-described process allows to realize the interruption copying operation in the course of the printing operation.

As explained in the foregoing, the reader controller judges and controls the acquisition of the printer engine and the timing of command issuance according to the status of the printer controller and the reader controller, whereby a single engine can accommodate the requests from the two controllers.

In the following discussion there will be explained the control in case the printer controller 213 issues a set content confirming command.

In case the printer controller 213 wishes to confirm the status set in the engine controller 202, the printer controller 213 issues a set content confirming command through the /CCMD signal. Upon receiving this command, the reader controller 901 checks the set value buffer shown in FIG. 19, and, if the content desired by the printer controller 213 is contained therein, such content is read and informed to the printer controller 213 by the /CSTS signal. If such content is not in the buffer, the reader controller 901 issues a set content confirming command through the /PCMD signal. The engine controller 202 reads the desired content and sends the set content by the /PTST signal to the reader controller 213, which in turn sends the set content by the /CTST signal to the printer controller 213.

In the following discussion there will be explained the control in case, in the printing mode, sheets are discharged to the face-up discharge exit (discharge means) 417 in excess of a predetermined capacity thereof.

The engine controller 202, upon detecting a reaction of a limit sensor (not shown) of the face-up discharge exit, transmits a change in the engine status to the reader controller 901, utilizing the status change signal /PCCRT as explained in the foregoing. As the reader controller 901 is in the printing mode, it generates the status change signal /CCCRT for informing the printer controller 213.

The printer controller 213 issues a command for acquiring the status change to the reader controller 901, and then understands, from the returned status, the content of the status change (disabled sheet discharge because of over capacity of the face-up discharge exit 417) of the engine.

Figure 23:
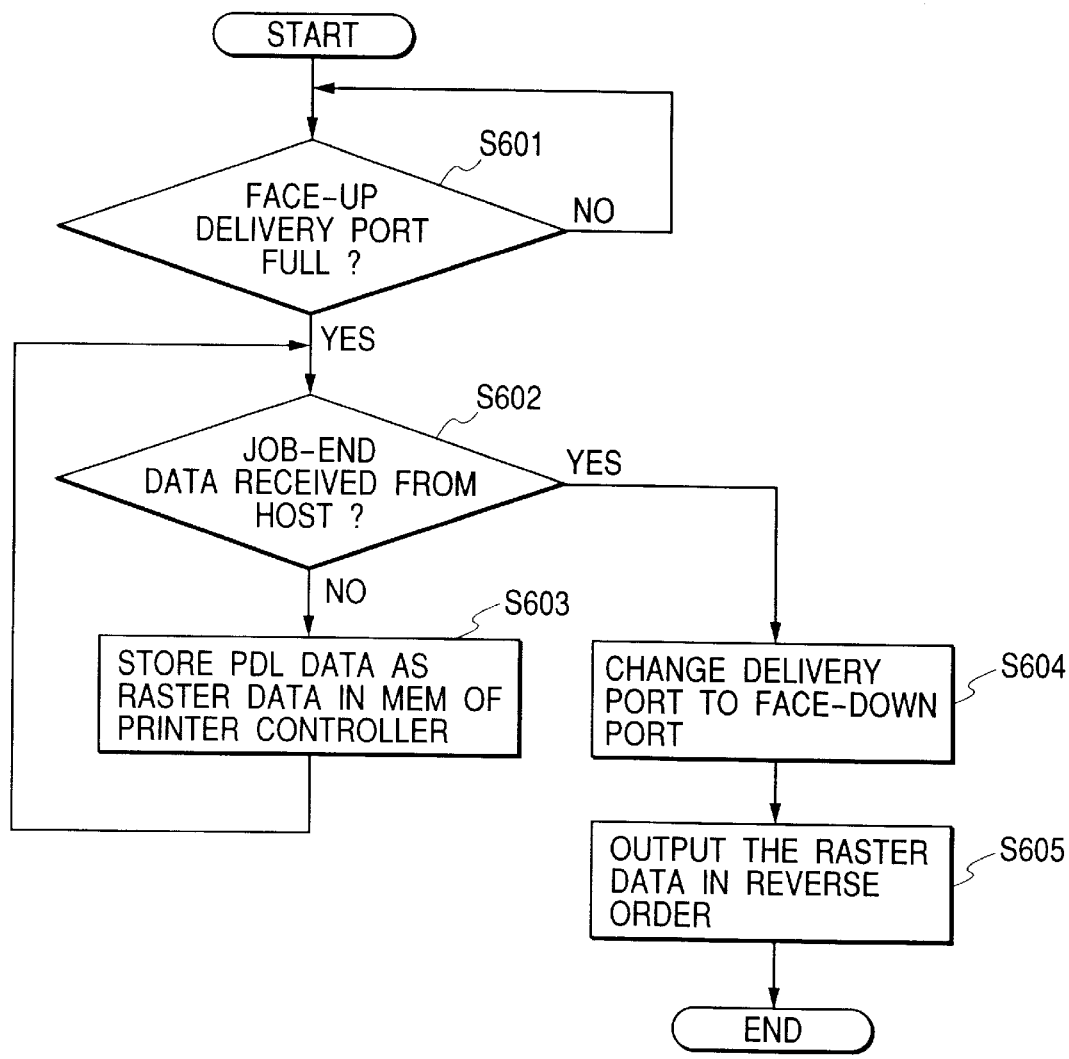
FIG. 23 is a flowcharts showing sheet discharge control in a first embodiment.

Then the printer controller (control means) 213 executes a process according to the sequence shown in FIG. 23. More specifically, when the capacity of the face-up discharge exit 417 is exceeded (step S601), until a JobEnd data indicating the termination of the PDL job is received from the host computer (step S602), the PDL data are developed and stored in a memory (not shown) in the printer controller 213 (step S603). After the JobEnd data is received, a discharge exit designating command is issued to the reader controller 901 to change the sheet discharged exit (step S604). Then the raster format data developed in the memory are transferred to the printer in an order of pages inverse to that received from the host computer (step S605).

In the present embodiment, therefore, in case the sheets are discharged to the face-down discharge exit 418 because of the over capacity of the face-up discharge exit 417, the printing is executed with the order of pages inverse to that of pages received from the host computer, so that the printed sheets can be obtained with the desired order of pages even when the discharge exit is changed.

Second Embodiment

In the 1st embodiment, when the amount of sheet discharge to the face-up discharge exit 417 exceeds the capacity thereof, the remaining sheets are discharged to the face-down discharge exit 418 with the inverse order of pages. In contrast, the second embodiment is, in case the amount of sheets discharged to the face-down discharge exit 418 exceeds the predetermined capacity thereof, the remaining sheets are discharged to the face-up discharge exit 417 with the inverse order of pages.

The engine controller 202, upon detecting a reaction of a limit sensor (not shown) of the face-down discharge exit, transmits a change in the engine status to the reader controller 901, utilizing the status change signal /PCCRT as explained in the foregoing. As the reader controller 901 is in the printing mode, it generates the status change signal /CCCRT for informing the printer controller 213.

The printer controller 213 issues a command for acquiring the status change to the reader controller 901, and then understands, from the returned status, the content of the status change (disabled sheet discharge because of over capacity of the face-down discharge exit 418) of the engine.

Figure 24:
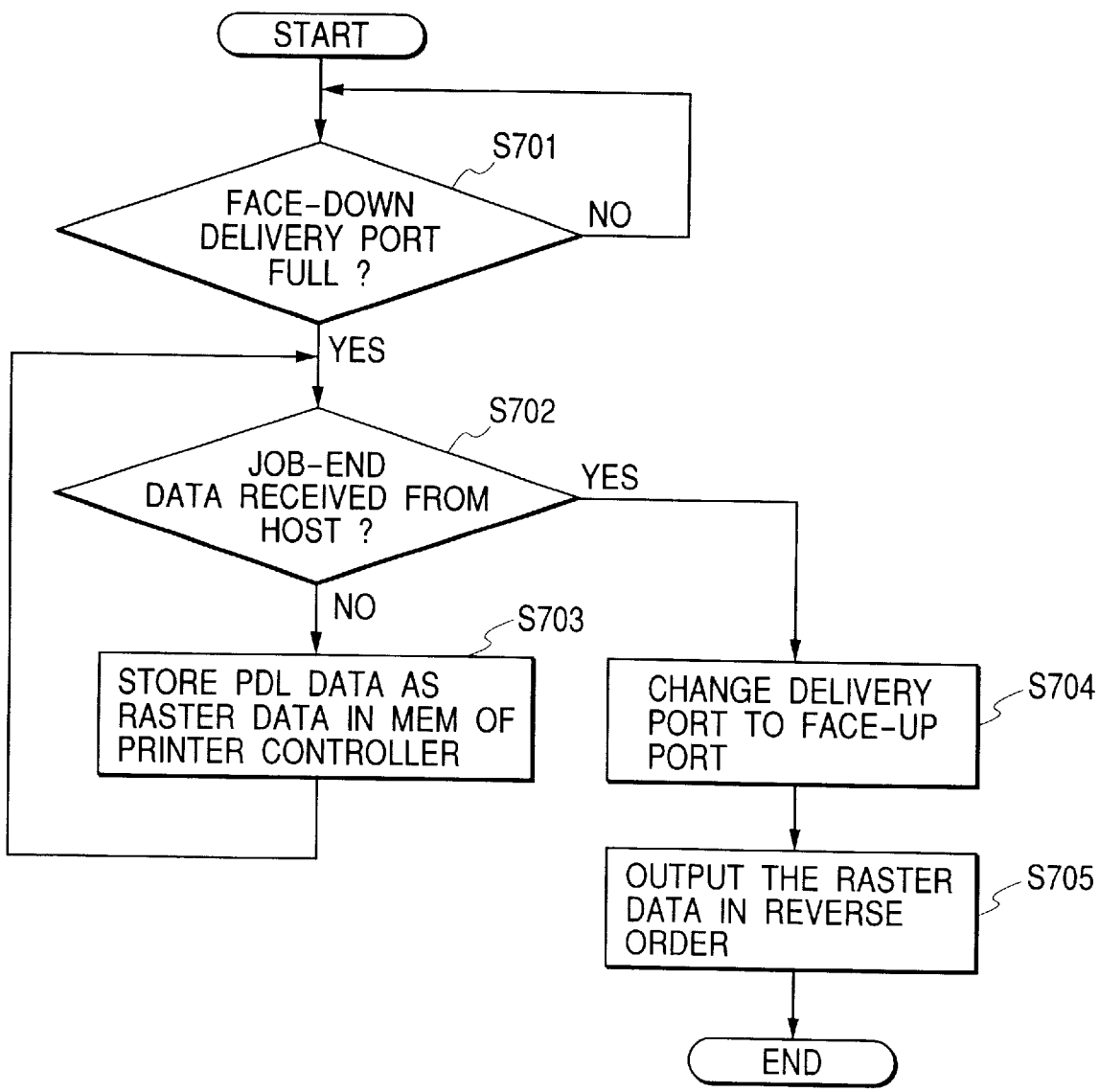
FIG. 24 is a flowcharts showing sheet discharge control in a second embodiment.

Then the printer controller 213 executes a process according to the sequence shown in FIG. 24. More specifically, when the capacity of the face-down discharge exit 418 is exceeded (step S701), until a JobEnd data indicating the termination of the PDL job is received from the host computer (step S702), the PDL data are developed and stored in a memory (not shown) in the printer controller 213 (step S703). After the JobEnd data is received, a discharge exit designating command is issued to the reader controller 901 to change the sheet discharge exit (step S704). Then the raster format data developed in the memory are transferred to the printer in an order of pages inverse to that received from the host computer (step S705).

In the present embodiment, therefore, in case the sheets are discharged to the face-up discharge exit 417 because of the over capacity of the face-down discharge exit 418, the printing is executed with the order of pages inverse to that of pages received from the host computer, so that the printed sheets can be obtained with the desired order of pages even when the discharge exit is changed.

The foregoing description has been limited to a printing device provided with two discharge exits, namely a face-up discharge exit and a face-down discharge exit, but the present invention is likewise applicable also to a printing device provided with three or more discharge exits. In such case, if a designated discharge exit becomes unusable for example because of full capacity in the course of a job, another discharge exit is selected automatically or by the user designation.

If the face-up/down type of the newly selected discharge exit is different from that of the previously designated discharge exit, there is executed the above-described process of inverting the order of remaining pages. On the other hand, if the types of the both discharge exits are same, the remaining pages are printed and discharged to the newly selected discharge exit without changing the order of pages.

In the foregoing embodiments, the entire process is executed in the printing device itself, but the process of re-selecting the discharge exit and/or the process of inverting the order of pages may be executed in the host computer.

What is claimed is:

1. An image processing apparatus for controlling an image forming unit provided with a print means for executing printing and a plurality of support means for supporting a printed recording media in respective supporting modes, said image processing apparatus comprising:

first storage means for storing image information data received from an external apparatus in a reception page order;

determination means for determining whether an entire piece of the image information data to be printed has been received from the external apparatus;

reception means for receiving status information data from the image forming unit in the process of outputting the image forming data received from the external apparatus with a designated one of the plurality of support means in a page order identical to the reception page order, the status information data representing that said designated one support means has become incapable of supporting the recording media; and control means, if said reception means receives the status information data, for controlling the image forming unit to output the image information data stored in said first storage means, which has not been output as the designated support means with another one of the plurality of support means in a page order suitable for the supporting mode of the another support means, in response to said determination means determining that the entire piece of the image input data has been received from the external apparatus, wherein said first storage means develops the received image information data into raster data and stores the raster data while receiving the image information data from the external apparatus, irrespective of results of a determination made by said determination means.

2. An image processing apparatus according to claim 1, further comprising:

input means for inputting the image information data;

conversion means for converting the inputted image information data into printable image data; and second storage means for storing the printable image data.

3. An image processing apparatus according to claim 1, wherein the status information data received by said reception means represents that the designated support means has become full of the printed recording medium.

4. An image processing method for controlling an image forming unit provided with a print means for executing printing and a plurality of support means for supporting a printed recording media in respective supporting modes, the method comprising the steps of:

storing image information data received from an external apparatus in a reception page order in a first storage means;

determining in a determination means whether an entire piece of the image information data to be printed has been received from the external apparatus;

receiving status information data from the image forming unit in the process of outputting the image information data received from the external apparatus with a designated one of the plurality of support means in a page order identical to the reception page order, the status information data representing that the designated one support means has become incapable of supporting the printed recording media; and controlling the image forming unit, if said reception means receives the status information data, for controlling the image forming unit to output the image information data stored in the first storage means, which has not been output as the designated support means with another one of the plurality of support means in a page order suitable for the supporting mode of the another support means, in response to the determination means determining that the entire piece of the image information data has been received from the external apparatus, wherein said storing step develops the received image information data into raster data and stores the raster data while receiving the image information data from the external apparatus, irrespective of results of a determination made by said determination step.

5. An image processing method according to claim 4, further comprising the steps of:

inputting the image information data;

converting the inputted image information data into printable image data; and storing the printable image data in a second storage means.

6. An image processing method according to claim 4, wherein the information received in the receiving step represents that the designated support means has become full of the printed recording medium.

7. An image forming apparatus comprising:

print means for executing printing;

a plurality of support means for supporting printed recording media in respective supporting modes;

first storage means for storing image information data received from an external apparatus in a reception page order;

determination means for determining whether an entire piece of the image information data to be printed has been received from the external apparatus;

detection means for detecting that a designated one of said plurality of support means has become incapable of supporting the printed recording media in the process of outputting the image information data received from the external apparatus with said designated support means in a page order identical to the reception page order; and control means, if said detection means detects that said designated support means has become incapable of supporting the printed recording media, for controlling an output operation such that the image information data stored in said first storage means, which has not been output with said designated support means is output with another one of said plurality of support means in a page order suitable for the supporting mode of said another support means, in response to said determination means determining that the entire piece of the image information data has been received from the external apparatus, wherein said first storage means develops the received image information data into raster data and stores the raster data while receiving the image information data from the external apparatus, irrespective of results of a determination made by said determination means.

8. An image forming apparatus according to claim 7, further comprising:

input means for inputting the image information data;

conversion means for converting the inputted image information data into printable image data; and second storage means for storing the printable image data.

9. An image forming apparatus according to claim 7, wherein said detection means detects that said designated support means has become full of the printed recording medium.

10. An image forming apparatus comprising:

a plurality of discharge means to which printed recording media are discharged in respective discharge modes;

first storage means for storing image information data received from an external apparatus in a reception page order;

determination means for determining whether an entire piece of the image information data to be printed has been received from the external apparatus;

detection means for detecting that the printed recording media cannot be discharged to a designated one of said plurality of discharge means in the process of outputting the image information data received from the external apparatus with said designated discharge means in a page order identical to the reception page order;

selection means, if said detection means detects that the printed recording media cannot be discharged to said designated discharge means, for selecting another one of said plurality of discharge means; and control means, if said selected discharge means is different in a discharge mode from said designated discharge means, for controlling an output operation such that the image information data stored in said first storage means, which has not been output with said designated discharge means is output with said selected discharge means in a page order suitable for the discharge mode of said selected discharge means, in response to said determination means determining that the entire piece of the image information data has been received from the external apparatus, wherein said first storage means develops the received image information data into raster data and stores the raster data while receiving the image information data from the external apparatus, irrespective of results of a determination made by said determination means.

11. An image forming apparatus according to claim 10, further comprising:

input means for inputting the image information data;

conversion means for converting the inputted image information data into printable image data; and second storage means for storing the printable image data.

12. An image forming apparatus according to claim 10, wherein said detection means detects that said designated discharge means has become full of the printed recording medium.

13. An image processing apparatus for controlling an image forming unit provided with a print means for executing printing and a plurality of discharge means to which printed recording media are discharged in respective discharge modes, said image processing apparatus comprising:

first storage means for storing image information data received from an external apparatus in a reception page order;

determination means for determining whether an entire piece of the image information data to be printed has been received from the external apparatus;

reception means for receiving status information data from the image forming unit in process of outputting the image information data received from the external apparatus with a designated one of the plurality of discharge means in a page order identical to the reception page order, the status information data representing that the printed recording media cannot be discharged to the designated discharge means;

selection means, if said reception means receives the status information data, for selecting another one of the plurality of discharge means; and control means for controlling an output operation such that the image information data stored in said first storage means, which has not been output with the designated discharge means is output with the selected discharge means in a page order suitable for the discharge mode of the selected discharge means, in response to said determination means determining that the entire piece of the image information data has been received from the external apparatus, wherein said first storage means develops the received image information data into raster data and stores the raster data while receiving the image information data from the external apparatus, irrespective of results of a determination made by said determination means.

14. An image forming apparatus according to claim 13, further comprising:

input means for inputting the image information data;

conversion means for converting the inputted image information data into printable image data; and second storage means for storing the printable image data.

15. An image processing apparatus according to claim 13, wherein the information received by said reception means represents that the designated discharge means has become full of the printed recording medium.

* * * * *

UNITED STATES PATENT AND TRADEMARK OFFICE
CERTIFICATE OF CORRECTION

PATENT NO. : 6,510,290 B2
DATED : January 21, 2003
INVENTOR(S) : Tsuyoshi Muto

It is certified that error appears in the above-identified patent and that said Letters Patent is hereby corrected as shown below:

Column 1,
Lines 13 and 36, "case" should read -- the case --.
Lines 31 through 32, "suspend-ing the discharge is either suspended" should read -- either suspending the discharge --.
Line 33, "and" should read -- or --.

Column 2,
Lines 39, 50 and 52, "flowchart" should read -- flowcharts --.

Column 3,
Line 36, "fixed" should read -- fixes --.
Line 49, "will" should read -- will be --; and "explain" should read -- explained --.
Line 64, "in at" should read -- is at --.

Column 4,
Line 42, "case" should read -- the case --.

Column 5,
Lines 7 and 8, "case" should read -- the case --.
Line 49, "following" should read -- following discussion --.

Column 6,
Line 1, "following" should read -- following discussion --.
Line 6, "as" should read -- so as --.
Line 7, "case" should read -- the case --.
Line 35, "request" should read -- requesting --.

Column 7,
Line 39, "illustration," should read -- the illustration, --.

Column 8,
Line 13, "receiving" should read -- for receiving --.

Column 10,
Line 12, "following" should read -- the following --.
Line 36, "following" should read -- following discussion --.
Line 54, "case" should read -- the case --.

UNITED STATES PATENT AND TRADEMARK OFFICE
CERTIFICATE OF CORRECTION

PATENT NO.    : 6,510,290 B2
DATED         : January 21, 2003
INVENTOR(S)   : Tsuyoshi Muto It is certified that error appears in the above-identified patent and that said Letters Patent is hereby corrected as shown below:

Column 14,
Line 28, "CTOP" should read -- /CTOP --.
Line 33, "90 1" should read -- 901 --.

Column 16,
Line 23, "the both" should read -- both --; and "same" should read -- the same --.

Signed and Sealed this

Twenty-third Day of September, 2003

JAMES E. ROGAN
*Director of the United States Patent and Trademark Office*